US011757296B2

(12) United States Patent
Singer et al.

(10) Patent No.: US 11,757,296 B2
(45) Date of Patent: Sep. 12, 2023

(54) SMART DISCHARGE OF A BATTERY

(71) Applicant: INTERNATIONAL BUSINESS MACHINES CORPORATION, Armonk, NY (US)

(72) Inventors: Noah Singer, White Plains, NY (US); Marc H. Coq, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 17/239,179

(22) Filed: Apr. 23, 2021

(65) Prior Publication Data
US 2022/0344955 A1    Oct. 27, 2022

(51) Int. Cl.
*H02J 7/00*    (2006.01)

(52) U.S. Cl.
CPC ........ *H02J 7/0063* (2013.01); *H02J 7/00712* (2020.01)

(58) Field of Classification Search
CPC .................................................... H02J 7/0063
USPC ........................................................ 320/132
See application file for complete search history.

(56) References Cited

U.S. PATENT DOCUMENTS

| | | | |
|---|---|---|---|
| 5,694,020 A | 12/1997 | Lang | |
| 6,700,351 B2 | 3/2004 | Blair | |
| 6,913,483 B2 | 7/2005 | Restaino | |
| 7,564,217 B2 | 7/2009 | Tanigawa | |
| 7,710,072 B2 * | 5/2010 | Ibrahim | H02J 7/0063 320/127 |
| 7,764,049 B2 * | 7/2010 | Iwane | G01R 31/367 320/132 |
| 9,263,901 B2 | 2/2016 | Boggs et al. | |
| 9,466,992 B2 | 10/2016 | Darragh et al. | |
| 11,070,068 B2 | 7/2021 | Singer | |
| 2010/0194340 A1 * | 8/2010 | Lim | H01M 10/486 320/128 |

(Continued)

FOREIGN PATENT DOCUMENTS

WO    2021001045 A1    1/2021

OTHER PUBLICATIONS

"Wireless Battery Charging Within a Holster", by Anonymous, IP.com, IPCOM000254873D, Aug. 9, 2018.

*Primary Examiner* — Yalkew Fantu
(74) *Attorney, Agent, or Firm* — Tihon Poltavets

(57) ABSTRACT

A method comprises an active discharge manager, integrated with a smart cable, detecting a connection of the smart cable to a battery and/or a discharge-load and detecting a connection coupling the battery and the discharge-load. Responsive to the detecting the connections, the active discharge manager determines a transfer status of the battery and the discharge-load. Based on the transfer status, the active discharge manager initiates a discharge process that transfers energy from the battery to the discharge-load. The active discharge-manager can determine a second transfer status of the battery and the discharge-load and, based on the second transfer status, terminate or modify the discharge process. The smart cable can be re-usable, and the discharge-load can make productive use of the energy transferred to the discharge-load. A system can comprise a battery, a discharge-load, and a smart cable to perform the method to discharge the battery into the discharge-load.

20 Claims, 5 Drawing Sheets

(56) References Cited

U.S. PATENT DOCUMENTS

| | | |
|---|---|---|
| 2013/0307480 A1 | 11/2013 | Boggs et al. |
| 2014/0203780 A1 | 7/2014 | Hu |
| 2015/0127282 A1* | 5/2015 | Sheng .................. G01R 31/386 |
| | | 702/63 |
| 2019/0058339 A1 | 2/2019 | Sergyeyenko |
| 2021/0028641 A1 | 1/2021 | Ilic et al. |
| 2022/0302745 A1 | 9/2022 | Singer |

* cited by examiner

SMART DISCHARGE OF A BATTERY

BACKGROUND

Electronic and electrical systems can use batteries to provide power. Under varying circumstances, it can be necessary to discharge a battery. The present disclosure relates to managing power states of a battery, and more specifically, to discharging a battery.

SUMMARY

According to embodiments of the present disclosure (hereinafter, "the disclosure"), a method comprises an active discharge manager, integrated with a smart cable, detecting a connection of the smart cable to one or both of a battery and a discharge-load and detecting a connection coupling the battery and the discharge-load to transfer energy from the battery to the discharge-load. Responsive to the detecting the connections, the active discharge manager determines a transfer status of the battery and the discharge-load. Further responsive to the detecting the connections, and based on the transfer status of the battery and the discharge-load, the active discharge manager initiates a discharge process to transfer energy discharged from the battery to the discharge-load.

In some embodiments, the method can include the active discharge-manager determining a second transfer status of the battery and the discharge-load. Based on the second transfer status, the active discharge manager terminates the discharge process or modifies an operation of the discharge process. Also, in embodiments, the smart cable is re-usable, and the method can further include the discharge-load making productive use of the energy discharged from the battery and transferred to the discharge-load.

Embodiments can include a smart cable having a status interface and having an active discharge manager integrated with the smart cable. The active manager can perform the method. A system for discharging a battery can comprise the battery and a discharge-load, The system can include a smart cable having an active discharge manager integrated with the smart cable. The active discharge manager can perform the method. In some embodiments the discharge-load can make productive use of energy discharged from the battery and transferred to the discharge-load. Also, in some such embodiments, the smart cable is removeable from the battery and the discharge load and can be reused to discharge another battery into another discharge-load.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure (hereinafter, "the disclosure) and, along with the description, serve to explain the principles of the disclosure. The drawings are only illustrative of certain embodiments and do not limit the disclosure.

Figure 1:
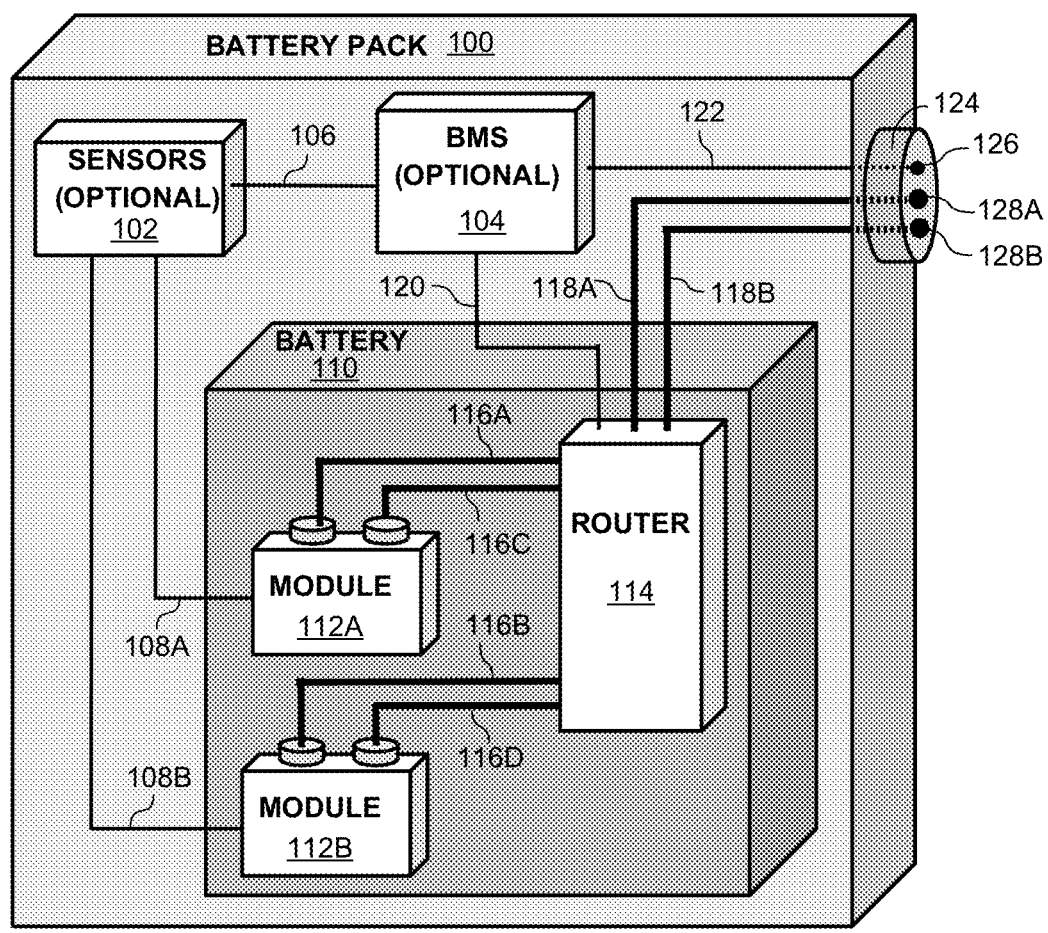
FIG. 1 illustrates an example battery subject to discharge, according to aspects of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

Electronic and electrical devices and systems can be "power consumers" that can draw electrical power from a battery to provide that power to these devices and systems. The term "battery", as used herein, refers to a storage element, or system, that can store electrical charge (hereinafter, "charge") and provide that charge to a power consumer. As used herein, "storage element" refers to an element of a battery that can store electric charge, such as an electrochemical battery "cell", or a battery module comprising one or more battery cells, or a storage element comprising a capacitor.

In embodiments of the disclosure (hereinafter, "embodiments") a "battery" can comprise a single storage element, or can comprise a plurality of storage elements. A "battery" can comprise a battery system—such as a "battery pack"—which can include battery cells, can include one or more battery modules (e.g., battery modules comprising one or more battery cells), and can include circuits to monitor, control, and/or interconnect battery cells and/or modules (e.g. to connect battery cells or modules to polarity terminals of a battery pack) within the battery system. Such a battery pack can include circuits to monitor and/or control delivery of electrical energy from the battery to a power consumer. Thus, as used herein, "battery" refers interchangeably to a battery per se, a battery pack, and any other form of battery system that includes one or more storage element to store charge and that can provide stored charge to power consumers.

Under a variety of circumstances, it can be necessary to discharge a battery, such as to establish a particular power state of the battery (e.g., a particular voltage, or a particular State of Charge, or "SOC"). Aspects of the present disclosure (hereinafter, "the disclosure") relate to methods and structures to discharge a battery. More particular aspects relate to actively managing discharge of a battery using an "active discharge manager". In embodiments, an "active discharge manager" can initiate, monitor, and/or control a battery, an electrical "load" that can receive electrical charge or energy from the battery during a discharge process, a cable coupling the battery and the load, and/or a discharge process itself. In embodiments, cable coupling a battery and a load can be a "smart" cable that includes such an active discharge manager. Further, in embodiments a system for discharging a battery can include a load that can advantageously utilize (e.g., to perform an operation or function other than simply dissipating energy received from a battery) charge transferred from the battery during discharge. While the disclosure is not necessarily limited to such applications, various aspects of the disclosure may be appreciated through a discussion of various examples using this context.

Large power consumers—such as large computers and computing systems, electric vehicles, and other complex electronic devices or systems—can have high power demands, such as requiring high voltages, high amounts of current, and/or high amounts of watts. For example, a large computing system can require several hundred watt-hours or amp-hours of power, or a sustained electric current of 20 amps or more, to operate for a particular period of time. Similarly, an electrically-powered vehicle (such as an automobile or freight truck) can require several hundred watt-hours of power, and/or tens of amps of electrical current, to propel the vehicle.

As used herein, with reference to battery power and/or the ability of a battery to store charge, "capacity" refers to an amount of electric power that a battery is capable of storing and/or providing. Such battery capacity is commonly stated with respect to a "full" State of Charge" (SOC) of the battery, and corresponds to measures such as amp-hours, watt-hours, or electric current output. Thus, as used herein, the term "high capacity battery" refers to a battery that has a capacity to store and/or provide a large amount of electric power, such as more than 100 watt hours or amp hours, or more than 10 or 20 amps of sustained current. A "high load consumer," then, refers herein to an electric, or electronic, device or system that uses, or requires, a high capacity battery. Such high load consumers can utilize high capacity batteries to provide power (e.g., operating power, and/or "backup" power to supplant utility power in response to loss of such utility power) to the system or, to a device of the system.

High capacity batteries can comprise battery systems, such as previously described, (e.g., a battery pack), and such battery systems can include components to monitor and/or manage internal elements of the battery (e.g., internal elements of a battery system, such as a battery pack). A high capacity battery can include, for example, electronic circuits and/or processors that can monitor and/or control the configuration of storage elements (e.g., battery cells and/or modules); the operation of the storage elements; charge and/or discharge of the battery, and/or voltages, currents, operating temperatures, and/or SOC of the battery. FIG. 1 illustrates an example high capacity battery comprising such a battery system.

FIG. 1 illustrates BATTERY PACK 100 comprising BATTERY 110, optional SENSORS 102, and optional battery management system BMS 104. Battery 110 comprises MODULES 112A and 112B (collectively, "modules 112") and ROUTER 114. Modules 112 can be battery modules that incorporate one or more battery cells to provide a particular power capacity, voltage, and/or current of BATTERY PACK 100 to a power consumer. ROUTER 114 can control configuration of battery modules 112 to combine the modules to provide a particular aggregate power capacity, voltage, and/or electrical current output of the battery pack.

BATTERY PACK 100 further includes connector 124, which can connect battery modules 112A and/or 112B to BATTERY PACK 100 (e.g., as configured by, or through, ROUTER 114) for delivery of electrical power from BATTERY PACK 100 to a power consumer. As shown in FIG. 1, connector 124 has connector terminals 126, 128A and 128B, which can connect to, for example, wires of a cable having a connector configured to mate to connector 124. In embodiments terminals 126, 128A and/or 128B can be pins (or, alternatively, sockets) or contacts that connect to sockets (or, alternatively, pins) or contacts of a mating connector (e.g., a connector of a cable).

FIG. 1 depicts terminal 126 connected to interface 122, which can facilitate communications between BMS 104 and a device or component of a system (not shown in FIG. 1) that connects to terminal 126. In embodiments, such a device or system can be, for example, a circuit, a processor, or a combination thereof. Such a circuit and/or processor can be a component of an active discharge manager, such as previously described, that can discharge battery modules 112 through power wires 118A and/or 118B of BATTERY PACK 100. Interface 122 can be, for example, a wire or, wires, that can transmit and/or receive digital signals.

Wires 116A, 116C, 116B, and 116D (collectively, "wires 116") connect modules 112A and 112B to ROUTER 114. Wires 118A and 118B (collectively, "wires 118") connect ROUTER 114 to connector terminals 128A and 128B (collectively, "terminals 128") of connector 124. In embodiments, wires 116 and wires 118 can be wires that can convey positive and negative polarity electrical power of battery modules 112, and ROUTER 114 can select battery modules, among modules 112, to pass power from the battery modules to terminals 128 of connector 124. For example, wires 116A and 116B can be of the same electrical polarity (e.g., positive polarity) and wires 116C and 116D can be wires of opposite polarity (e.g., negative polarity).

In a particular configuration, ROUTER 114 can (e.g., via switches internal to ROUTER 114) connect both of wires 116A and 116B to wire 118A, and both of wires 116C and 116D to wire 118B, to provide battery power, electrically in parallel, from modules 112, to terminals 128 of connector 124. Alternatively, ROUTER 114 can connect wires 116C and 116B to each other and connect wire 116A to wire 118A and wire 116D to wire 118B, to provide battery power, electrically in serial, from modules 112, to terminals 128 of connector 124. In another configuration, ROUTER 114 can connect only wire 116A to wire 118A and connect only 116C to wire 118B, to provide battery power from only MODULE 112A to terminals 128 of connector 124. ROUTER 114 can similarly connect only wire 116B to wire 118A and connect only 116D to wire 118B, to provide battery power from only MODULE 112B to terminals 128.

As FIG. 1 further depicts optional BMS 104 connects via interface 120 to ROUTER 114. In embodiments, wire 120 can be a communications and/or control interface (e.g., one or more digital signal wires) to ROUTER 114. BMS 104 can utilize interface 120 to instruct ROUTER 114 how to connect wires 116 to wires 118, such as to modify the power provided from BATTERY PACK 100 to terminals 128 of connector 124. FIG. 1 also illustrates optional SENSORS 102 connected to modules 112 via interfaces 108A and 108B (collectively, "interfaces 108"). In embodiments, interfaces 108 can be, for example, signal wires or, alternatively, can be wireless interfaces. Using interfaces 108, sensors, such as 102, can receive status, such as a "condition status", from the battery modules. In embodiments, a "condition status" can comprise, for example, parameters and/or a state of a battery module (or, a component of a battery module, such as a battery cell). Such parameters and/or states can include a temperature, a voltage, a current flow, a state of charge, and/or an operating condition (e.g., a failure or impending failure) of the battery module and/or a component of the battery module.

In FIG. 1 SENSORS 102 connect, via interface 106, to BMS 104. Interface 106 can be one or more signal wires and/or can comprise a wireless interface. Using interface 106, BMS 104 can, for example, request and/or receive condition status of battery modules 112 (and/or other components of BATTERY PACK 100) from SENSORS 102. In embodiments, an active discharge manager connected to interface 122 via terminal(s) 126 of connector 124 can communicate with BMS 104 (and/or other components of BATTERY PACK 100 not shown in FIG. 1, and/or not shown in FIG. 1 as connected to interface 122) to request and/or receive condition status of battery modules 112 (and/or other components of BATTERY PACK 100). An active discharge manager connected to interface 122 can communicate with BMS 104 (and/or other components of BATTERY PACK 100) to instruct BMS 104 (and/or other components of BATTERY PACK 100) to modify an operating parameter (e.g., a voltage, temperature, or current flow) of BATTERY PACK 100 or components thereof (e.g., MODULES 112A and/or 112B). Using interface 122, BATTERY PACK 100 can receive instructions from an active discharge manager to configure modules 112 (using ROUTER 114) to provide power to terminals 128 of connector 124.

The example of FIG. 1 is intended to illustrate a battery system (e.g., a battery pack) that can, in particular, determine and communicate condition status of battery modules (e.g., using sensors such as 102), respond to external components (e.g., an active discharge manager) to acquire and communicate such status (e.g., using a battery management system, or "BMS", such as BMS 104), and, possibly, to configure individual battery modules to connect the battery modules to a power consumer. However, FIG. 1 is not intended to limit embodiments, and it would be apparent to one of ordinary skill in the art that the methods and structures of the disclosure can apply to any form of a battery, or battery system, including a battery or battery system that does not include sensors and/or a battery management system, such as illustrated in FIG. 1, and/or that includes components of a battery system alternative to, or in addition to, those illustrated in FIG. 1 as components of BATTERY PACK 100.

It would be further apparent to one of ordinary skill in the art that in embodiments a battery, or battery system, can include sensors that can receive any variety of battery status, sensor outputs can be coupled to a connector of a battery or battery system in ways other than as shown in FIG. 1, and that a battery management system (and/or similar components) of a battery, or battery system, can perform a variety of functions and/or operations other than as described herein, and can communicate the results of such functions or operations to a component external to the battery, or battery system, (e.g., an active discharge manager) via an interface such as 122.

As previously described, high capacity batteries, such as illustrated by the example of FIG. 1, can store a high amount of electrical charge, and can have high voltage and/or current characteristics, such that servicing, storing, and/or transporting a battery at a capacity above a particular level (e.g., a safety threshold of a voltage or SOC) can be problematic or even hazardous. For example, a high capacity battery can be hazardous for a technician to service (e.g., repair or replace the battery) if the service were to be performed at an SOC of the battery above a particular threshold SOC. Similarly, it can be hazardous to store such a battery at an SOC of the battery above a particular threshold SOC, as an inadvertent discharge could create a safety hazard. Further, some batteries, and/or battery technologies, can require that a battery be below a "safe" SOC to transport the battery. For example, present government regulations classify lithium batteries having a capacity of 100 Ah or more as hazardous to transport if at an SOC greater than, for example, 30% of the battery's full capacity SOC. Thus, such batteries must be at an SOC no greater (or, alternatively, less) than such a safe threshold (e.g., 30% of full) SOC in order to transport the battery (e.g., to transport the battery using commercial transportation, such as by truck, rail, air, or ship).

Under such circumstances, it can be necessary to discharge a high capacity battery to a reduced capacity (e.g., a voltage and/or SOC below a particular threshold value) prior to performing certain operations on the battery, such as service, storage, or transport. Methods and structures to discharge a battery can comprise coupling the battery to a "discharge-load" that can receive charge from the battery. As used herein, the term "discharge-load" refers to any form of electrical or electronic device, or system, utilized to dissipate power in the process of discharging a battery.

Commonly, a discharge-load comprises a simple resistive load that draws power from the battery and dissipates that power as "waste" heat. However, heat dissipated by such a discharge-load, as "waste heat", provides no useful purpose other than to dissipate the energy discharged from the battery and, in some environments, dissipating the waste heat can itself be problematic. Methods that discharge a battery as waste heat, and/or without active control of the discharge process (e.g., without active control by an active discharge manager) such as simply coupling a battery to a resistive load, can also be time consuming, as they can depend solely on a rate of discharge corresponding to the particular resistive load. Additionally, if not monitored and controlled while discharging a battery, various condition status of the battery, the load, and/or a cable connecting the battery to the load, can damage a component of the battery, load, and/or a cable coupling a battery and a load. For example, conditions, or states, such as high temperatures and/or high or low voltage can present environmental hazards, and/or can be damaging or otherwise detrimental to components of the battery, load, or cable, and can further affect the rate, or safety, of the discharge process.

Hence, methods and structures of the disclosure that discharge a battery in an "actively managed" manner, and that can discharge the energy of a battery into a discharge-load as useful energy—rather than "waste heat"—can be advantageous. As used herein, discharging a battery "into" a discharge-load refers to transferring electrical charge, or electrical energy associated with electrical charge, from the battery to the discharge-load. As further used herein, "energy" refers to electrical energy associated with electrical charge transferred from a battery, and "transferring energy" refers interchangeably to transferring electrical charge, or electrical energy, from the battery to a receiving element (e.g., a discharge-load), whether the electrical charge received is stored by that element, or used (e.g., to perform a useful function) by that element.

Embodiments can include methods and structures utilizing an active discharge manager to perform a discharge process of a battery and, to optionally, make productive use of energy transferred from a battery to a discharge-load in that process. Thus, as used herein "discharge process" refers more particularly to an actively managed process to discharge a battery and to transfer electrical energy discharged from the battery (or, other charge-storing element) to a discharge-load, and which can include the discharge-load making productive use of the energy transferred. "Actively managed", as used herein, refers to a discharge process in which an active discharge manager monitors conditions and/or states of a battery, a discharge-load, and/or a discharge cable coupling the battery and the discharge-load, to initiate the discharge process, and to modify operations of the discharge process in respons to the monitored conditions and/or states.

"Discharge cable" refers herein to a set of wires to couple a battery and a discharge-load to facilitate transfer of energy discharged from the battery to the discharge-load. In embodiments, a discharge cable can comprise power wires to transfer energy discharged from a battery to a discharge-load. Power wires of a discharge cable can comprise, for example, positive and/or negative polarity wires to transfer energy discharged from a battery to a discharge-load. A discharge cable can comprise a casing to enclose the power wires, and can have connectors on respective ends of the casing to couple the power wires to a battery and/or a discharge-load. In some embodiments, a discharge-cable can comprise a single power wire, such as in, for example, an embodiment in which the battery and discharge-load are connected to a common electrical ground. In such an embodiment, a discharge-cable can comprise only a positive polarity power wire (or, wires) to electrically couple the battery and discharge-load for transfer of energy discharged from the battery to the discharge-load.

A discharge cable can further comprise a status interface, such as signal wires in a digital interface, or signal fibers, in a fiber-optic interface. A status interface of such a discharge cable can comprise signal wires and/or alternative communications circuits to communicate with components of a battery, the discharge cable, and a discharge-load. A status interface of a discharge cable can comprise signal wires (and/or, components of a wireless interface), for example, to indicate or communicate a status (e.g., a condition status) of a battery (and/or a component therein), a status (e.g., a condition or connection status) of the discharge cable (and/or a component therein), and/or a status (e.g., a condition status) of a discharge-load (and/or a component therein).

Figure 2:
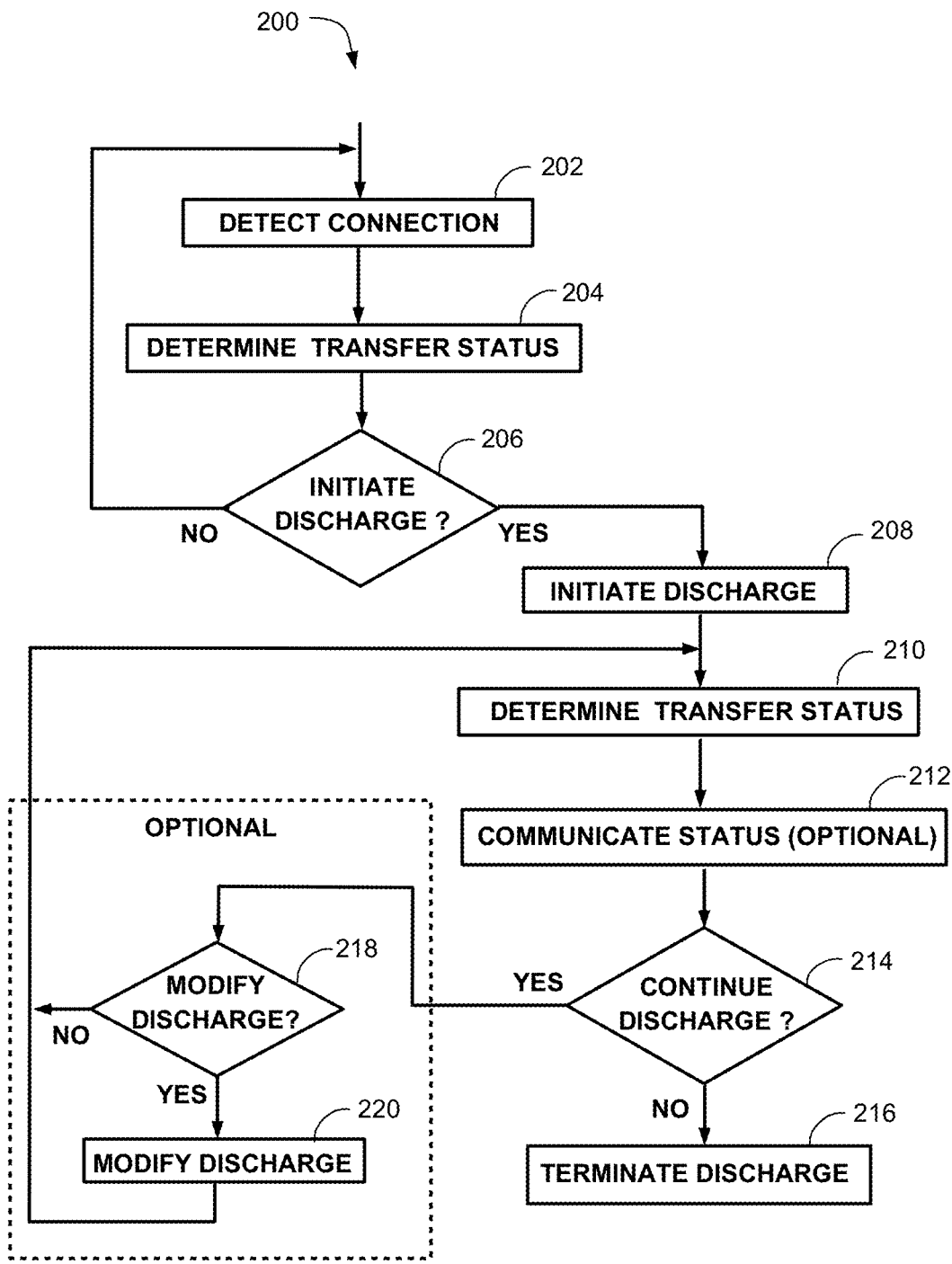
FIG. 2 is a flowchart illustrating an example method for discharging a battery, according to aspects of the disclosure.

In embodiments, an active discharge manager (hereinafter, for brevity, "active manager") can perform a discharge processing which the active manager initiates, monitors, and/or controls (e.g., modifies operations of) a battery, a discharge cable, a discharge-load, and/or the discharge process overall, responsive to various (and, changing) conditions or states (e.g., a condition status) of the battery, cable, and/or discharge-load. FIG. 2 illustrates an example method of such a discharge process using an active manager to perform the method.

An active manager can be integrated with a "smart cable". FIGS. 3A-6 illustrate example embodiments of a "smart cable" that can comprise an active manager (or, components thereof), integrated with a discharge cable. Alternatively, while not illustrated in these examples, a smart cable can comprise the active manager and a status interface; and, a discharge cable, separate from the smart cable, can include power wires to electrically couple a battery to a discharge-load to transfer energy from the battery to the discharge-load. In embodiments, a smart cable can be separable (e.g., connectable and dis-connectable) from the battery and/or the discharge-load, and can be re-usable with other batteries (including batteries of differing technologies) and/or with other discharge-loads (including discharge-loads having differing load circuits and that can use energy transferred from a battery in differing manners).

In embodiments, an active manager can use the status interface of the smart cable to, for example, detect a connection of the smart cable (and/or a separate discharge cable) between a battery and a discharge-load coupled by the smart cable (and/or a separate discharge cable). The active manager can use the status interface to receive status from a battery, the smart cable (and/or a separate discharge cable) and/or a discharge-load. An active manager can use the status interface to modify operations of the battery, the discharge-load, the smart cable (and/or a separate discharge cable) and/or the discharge process. An active manager can modify such operations using, for example, the status interface to instruct components of the battery, the smart cable, and/or the discharge-load to modify an operating parameter of the discharge process. In embodiments comprising a discharge cable separate from a smart cable, an active manager of the smart cable can be communicatively coupled to the separate discharge cable, such as communicatively coupled to plug detection features and/or sensors of the separate discharge cable.

A discharge process can, optionally, facilitate or, affect, a discharge-load making productive use of energy discharged from the battery. To "make productive use" of energy transferred from a battery, as used herein, means utilizing energy transferred from a battery, during a discharge process of the battery, by a discharge-load to perform some useful operation or function, other than to simply dissipate the energy as waste heat. A discharge process can be used, for example, as part of a service operation of the battery. As used herein, a "service operation" of the battery refers to operations such as replacing the battery with a replacement battery; performing a repair or upgrade operation on a battery; preparing a battery for transport, and/or transporting the battery (e.g., transport by a commercial transport carrier); and/or preparing a battery for storage. For example, servicing a battery can include replacing a failing battery, and a replacement battery may be transported at a low SOC (e.g., a 30% SOC corresponding to a regulatory limit to transport a lithium battery). An active manager can perform a discharge process that transfers energy from the battery being replaced to a discharge-load comprising, or including, the replacement battery, such as to increase the SOC of the replacement battery.

However, this example is not intended to limit embodiments, and it would be apparent to one of ordinary skill in the art that a smart cable and ana active manager can be utilized in a variety of circumstances, and/or in a variety of operations, other than a service operation, to perform a discharge process that can make productive use of energy of a battery in a discharge-load. In another example, a discharge-load can be, or can include, a "load circuit" that can perform an operation, or a function, associated with a service operation on the battery, or perform an operation or a function to prepare the battery for storage or transport. Such a load circuit can be a circuit of a discharge-load that performs functions of, or provides power to, an active manager and/or to another component of a system involved in the discharge process. A load circuit can be a circuit that provides electrical power to a device that performs other functions that may be associated with discharging the battery, such as monitoring a SOC of a discharge-load. It would be apparent to one of ordinary skill in the art to apply any variety of load circuits that can perform useful operations and/or functions, during a discharge process, as components of a discharge-load, including operations and/or functions not directly in support of, or related to, discharge of the battery.

Turning now to FIG. 2, example method 200 illustrates operations of a discharge process as performed by an active manager of a smart cable, and that can, in particular circumstances and configurations, make productive use of energy discharged from the battery. In operation 202 of method 200, the active manager detects a connection of smart cable coupling a battery and a discharge-load to transfer energy from the battery to the discharge-load.

As previously described, in embodiments a smart cable can comprise the active manager, a status interface, and power wires to transfer energy from the battery to the discharge-load or, alternatively, a smart cable can comprise the active manager and a status interface, and power wires can be included in a discharge cable (or other form of connection between the battery and discharge-load) separate from the smart cable. Thus, it will be understood by one of ordinary skill in the art that references herein to "power wires" refer to power wires to transfer energy from a battery to a discharge load whether the power wires are included in a smart cable or are included in a discharge-cable separate from the smart cable. It will be further understood by one of ordinary skill in the art that references that follow herein to a smart cable apply implicitly to a separate discharge cable in embodiments that utilize such a separate discharge cable.

In operation 202, then, the active manager can detect the connection based on a connection status of the smart cable relating to, for example, connectors of the smart cable; the status interface of the smart cable; and/or, power wires of the smart cable. A connection status can indicate, for example, a connection of a status interface to one or both of a battery and a discharge-load, or can indicate a connection of power wires of a smart cable to corresponding polarity terminals (or, alternatively, power wires) of one or both of a battery and/or a discharge-load. While it can be advantageous for an active manager to detect a connection of a status interface, and/or power wires, of the smart cable to both of a battery and a discharge-load, in embodiments a connection status indicating a smart cable connection to one of the battery and the discharge-load can imply a connection of the cable to the other. Accordingly, in such an embodiment an active manager can determine that the smart cable makes a connection to couple a battery and a discharge-load based on detecting a connection status indicating a connection of the smart cable (e.g., connection of a status interface and/or power wires) to only one of the battery and the discharge-load.

In another example, an embodiment of a smart cable (and/or, a separate discharge cable) can include a plug detection feature (e.g., an electrical and/or a mechanical mechanism, which can be included, for example, in connectors or other components of the cable) to indicate that a connector of the smart cable is connected to a battery and/or discharge-load (e.g., connected to a mating connector of a battery and/or discharge-load). In operation 202, the active manager can receive an output of a plug detection feature (e.g., a signal wire or data communication) and the active manager can detect a connection coupling a battery and a discharge-load based on the output of such a plug detection feature. In embodiments a plug detection feature can be included, in whole or in part, in a smart cable. Alternatively, a plug detection feature can be implemented, in whole or in part, in a battery and/or a discharge-load, and an active manager can receive outputs of the plug detection feature via, for example, a status interface of the smart cable.

Further, in operation 202 an active manager can detect the connection by receiving a data communication signifying that a smart cable has made a connection to couple the battery and the discharge-load. For example, in embodiments a smart cable can further include interfaces, such as wires and/or wireless communications elements, that can enable the active manager to receives a data communication (e.g., from a device used by a technician) conveying a connection status of the smart cable and/or a separate discharge cable. The active manager can receive such a data communication, for example, via a signal wire (or, wires) of the smart cable, from components of the battery, the smart cable, a separate discharge cable, and/or the discharge-load. Alternatively, or additionally, the active manager can receive a connection status from a system, or device, communicatively coupled (such as by wireless communications interfaces) to the active manager, indicating a connection is established coupling the battery and discharge-load to transfer energy from the battery to the discharge-load.

In operation 204 the active manager determines a "transfer status" associated with one or more of the battery, the smart cable, and the discharge-load. The active manager can determine the status in conjunction with, or based on, determining, in operation 202, the connection between the battery and the discharge-load. In embodiments a transfer status can comprise a condition status of the battery, the smart cable, and/or the discharge load, such as a temperature; an amount of current flow; a voltage; and/or an SOC.

A transfer status can indicate, for example, that a condition or state of one or more of the battery, smart cable, and discharge-load (or, a component of these) is, or is not, within a "discharge range". A "discharge range", as used herein, refers to a particular range of conditions or states (or, values of such conditions or states), such as a condition or state above a threshold value, a condition or state below a threshold value (i.e., a maximum or minimum value), or a condition or state between (possibly inclusive of) an upper threshold value (e.g., a maximum value) and a lower threshold value (e.g., a minimum value). Thus, a discharge range can comprise, for example, a voltage, current, temperature, and/or SOC that is above (or, alternatively, below) a threshold value, or is between two threshold values.

A transfer status can include a connection status (e.g., connected or disconnected) of wires (e.g., signal and/or polarity wires) of the smart cable to wires and/or contacts (e.g., terminals or contacts of a connector) of the battery, of the discharge-load, and/or of the active manager. A transfer status determined in operation 204 can comprise, for example, a status of a component of the battery, smart cable, and/or discharge-load, such as a status of a BMS, sensor, discharge circuit or other component of a battery and/or battery pack, a component of a discharge-load, or a component of an active manager included in a smart cable.

A transfer status can include a status of the discharge process, such as a status indicating a fraction of the discharge process that has completed, or that a technician has suspended, or terminated, the discharge process. A transfer status can indicate a failure (or, degradation or impending failure) of a component of the battery, smart cable, and/or discharge-load. For example, a battery can include a processor (and/or a control circuit) to manage operations and/or states of the battery and a transfer status can indicate that a failing battery is failing due to a failure of the processor (and/or control circuit). However, these examples are not intended to limit embodiments and a person of ordinary skill in the art will appreciate that a transfer status can indicate any variety of conditions and/or states of a battery, smart cable, active manager, discharge-load, and/or discharge process in addition or alternative to such examples.

In operation 206, the active manager determines, based at least in part on the transfer status, whether or not to initiate a discharge process of the battery. For example, a condition or state of the battery, smart cable, and/or discharge-load not within a discharge range can present a safety hazard, and/or risk of damage to the battery, smart cable, and/or discharge-load, if a discharge process is initiated. Such a condition or state can include, for example, a temperature, voltage, SOC, or current flow of a battery, the smart cable, and/or a discharge-load, above (or, alternatively, below) a threshold value. Thus, in operation 206 the active manger can determine to not initiate the discharge process based on the transfer status determined in operation 204 indicating that initiating a discharge process presents a safety hazard or risk of damage to the battery, smart cable, and/or discharge-load. In another example, in operation 206 the active manger can determine to not initiate the discharge process based on a transfer status, determined in operation 204, indicating a component failure, or degradation or imminent failure of a component, of the battery, smart cable, and/or discharge-load; indicating a disconnection of the smart cable (or, wires included therein) from one or both of the battery and discharge-load; and/or indicating that the discharge process is to be suspended or terminated.

If, in operation 206, the active manager determines to not initiate the discharge process, the active manager can repeat operations 202-206, such as to detect a change in a connection, or to determine a change in a transfer status, that may facilitate initiating the discharge process. In repeating operation 206 the active manager can determine whether or not to initiate discharge process based on a connection or transfer status determined in repeating operations 202 and 204.

Alternatively, in operation 206, the active manager can determine that the transfer status determined in operation 204 indicates that a discharge process can be initiated. For example, in 206 the active manager can determine to initiate the discharge process based on a connection status detected in 202, and/or a transfer status determined in 204, that indicate the discharge process can proceed safely and/or complete properly, and/or that the discharge-load can make productive use of energy transferred from the battery. In 206 the active manager can determine to initiate the discharge process based, for example, on a transfer status determined, in 204, indicating that conditions or states of the battery, smart cable, and discharge-load are all within a discharge range. In operation 206, the active manager can determine to initiate a discharge process based, for example, on a transfer status determined, in 204, indicating a failure or degradation of a component of a discharge-load and, based further, on detecting a connection (e.g., in 202 or 204) that the battery is connected to an alternative discharge-load (e.g., a resistive load that can dissipate energy transferred from the battery).

If, in operation 206, the active manager determines to initiate the discharge process, in operation 208 the active manager initiates the discharge process to transfer energy from the battery to the discharge-load. In embodiments, in operation 208 initiating the discharge process can comprise, for example, an active manager establishing a connection of power wires from the battery to the smart cable, establishing a connection of power wires from the discharge-load to the smart cable, and/or a connection of power wires between the battery and the discharge-load through the smart cable. In another example, in embodiments a discharge-load can include a load circuit that can utilize energy transferred from the battery in the discharge process. In operation 208, initiating a discharge process can include the active manager communicating to the discharge-load (or, a component thereof) to prepare the load circuit to receive and/or utilize electrical energy from the battery.

However, these examples are not intended to limit embodiments, and it would be apparent to one of ordinary skill in that art that, in operation 208 (or, an operation similar to 208) that initiating a discharge process can comprise an active manager performing, and/or instructing a battery and/or discharge load, or components of these and/or a smart cable, to perform a variety of operations that prepare or activate transfer of energy from the battery to the discharge-load.

In operation 210 the active monitor determines an additional transfer status associated with the discharge process in progress. Such an additional transfer status an be a status related to the battery, smart cable, discharge-load, and/or discharge process. In embodiments, a transfer status determined in operation 210 can be the same as, or similar to, that determined in operations 202 and/9r 204. A transfer status determined in 210 can indicate that a connection of the smart cable to one or both of the battery and the discharge-load has been broken. A transfer status determined in 210 can indicate that the discharge process is proceeding, and/or can continue, safely, without risk of damage, and/or can complete properly. Alternatively, a transfer status determined in 210 can indicate that the discharge process cannot continue safely, without risk of damage, and/or may not complete properly, under instant conditions or states of the battery, smart cable, and/or discharge-load. A transfer status determined in 210 can indicate that the discharge-load can no longer use, or use productively, energy transferred from the battery.

In operation 212, the active manager, optionally, communicates status information associated with the transfer status determined in (and/or related to) operation 210, and/or a status of the discharge process overall. For example, in embodiments a battery, smart cable (or, active manager, or component thereof), and/or a discharge-load can include a visual status indicator (e.g., LEDs and/or a computer display) to communicate status information, such as associated with the transfer status determined in operations 210, to a technician servicing the battery, or monitoring the discharge process. Additionally, or alternatively, in embodiments a battery, smart cable (or, active manager, or component thereof) can include a communications interface (e.g., a wireless transmitter) that can transmit status information to a receiving device (e.g., a mobile device, and/or an application program of a mobile device) to communicate status information, such as associated with the transfer status determined in operations 210, to a technician servicing the battery, or monitoring the discharge process.

Status information communicated in operation 212 can include a condition, state, and/or a connection and/or transfer status (e.g., determined in 210) of the battery, smart cable, and/or discharge-load. Status information communicated in operation 212 can include a status of the discharge process, such as that the process has (or, alternatively, has not) been initiated, is in progress (and/or a fraction of the discharge process completed or remaining), and/or has been (or, will be) discontinued (e.g., suspended and/or terminated). Status information communicated in operation 212 can include information regarding the use of the energy by the discharge-load, or that the discharge-load can no longer use, or use productively, energy transferred from the battery.

In operation 214, the active manager determines, based on the transfer status determined in 210, whether or not to continue the discharge process. For example, in operation 214 the active discharge manager can determine to continue the discharge process (initiated in operation 208) based on a transfer status determined in operation 210 indicating that the discharge process is incomplete and that the process can continue (e.g., continuing the discharge process poses no safety hazard or risk of damage, and/or that the discharge-load can continue to use, or use productively, energy transferred from the battery). Transfer status determined in 210 can indicate, for example, that a technician or system has instructed or signaled (e.g., via an interface coupled to the active manager) to suspend the discharge process. Accordingly, in operation 214 the active manager can determine to continue (e.g., in a suspended state) the discharge process based on the transfer status indicating the technician's signal to suspend the discharge-process.

If, in operation 214, the active manager determines to continue the discharge process, the active manager can repeat operations 210 and 212 or, optionally, can perform operations 218, 220, 210, and 212. In repeating operation 210, the active manager can determine further transfer status of the discharge process in progress, and can repeat operations 212 (optionally) and 214. For example, in repeating operation 210 the active manager can determine an additional transfer status indicating that a connection of the smart cable to the battery and/or discharge-load that was previously disconnected, has been restored and, in 212, the active manager can determine that the discharge process can continue. In repeating operation 210 the active manager can determine an additional transfer status indicating that the discharge-load can continue to use, or use productively, energy transferred from the battery and, in 214 the active manager can determine to not continue the discharge process. In repeating operation 210 the active manager can determine an additional transfer status indicating that the discharge process cannot continue safely, or without risk of damage, or that the discharge-load cannot continue to use, or use productively, energy transferred from the battery, and, in 214 the active manager can determine to not continue the discharge process.

If the active manager determines, in 214, to continue the discharge process and, optionally, performs operations 218 and 220, in operation 218 the active manager determines whether or not to modify the discharge process in progress. For example, a transfer status determined in 210 can indicate that the discharge process is progressing without presenting a safety hazard or risk of damage; proceeding at a rate and/or under conditions to complete the discharge process properly; and/or that the discharge-load can continue using, or using productively, energy transferred from the battery. Accordingly, the active manager can determine in operation 220, based on such status, to not modify the discharge process, and the active manager repeats operations 210-214.

Alternatively, in 218 the active manager can determine to modify an operation of the discharge process, such as based on a transfer status determined in operation 210. For example, a transfer status determined in 210 can indicate that a condition or state of the battery, smart cable, and/or discharge-load (e.g., a temperature, voltage, SOC, or current flow) is at, or is approaching, a level that is not within a discharge range, or can present a safety hazard or risk of damage. A transfer status determined in 210 can relate to use by the discharge-load of energy transferred from the battery, such as a status indicating the discharge-load is at, or approaching, a state in which the discharge-load can no longer use, or make productive use of, energy transferred from the battery. Accordingly, in 218 the active manager can determine, based on such status, to modify an operation of the discharge process.

In another example, the discharge manager can determine, in operation 218, to modify an operation of the discharge process based on a transfer status determined in 210 indicating a failure, a degradation, and/or an impending failure or degradation of a the battery, the smart cable, and/or the discharge-load, or a component of these. In operation 218 the active manager can receive a communication (not shown in FIG. 2) and can determine to modify the discharge process in response to receiving the communication. For example, in operation 218 the active manager can receive a communication (e.g., from a technician, from a computing element, or form the battery or discharge-load) instructing the active manager to suspend the discharge process, or to otherwise modify the discharge process in a particular way (e.g., reduce a current flow or temperature).

If, in 218 the active manager determines to modify the discharge process, in 220 the active manager modifies (and/or instructs a component of the battery, smart cable, and/or discharge-load to modify) an operation of the discharge process. In embodiments, in operation 220 the active manager can modify activity or operations of the battery, smart cable, and/or discharge-load, and/or can instruct components (e.g., using the status interface) of the battery, smart cable, and/or discharge-load to take a particular action to monitor conditions or states, or to modify activity or operations of components the battery, smart cable, and/or discharge-load.

For example, in operation 220 the active manager can modify (an/or instruct a component to modify) a rate of the transfer of energy from the battery to the discharge load; a voltage, current flow, and/or temperature of the battery, the smart cable, the discharge-load, and/or a component of these; and/or a temperature of the battery, smart cable, and/or discharge-load, or component of these. In 220 the active manager can modify (and/or instruct a component of a discharge-load to modify, for example, to modify) use of energy transferred from the battery to the discharge-load.

In operation 220, an active manager can instruct the battery, smart cable, discharge-load, and/or a component of these, to monitor particular inputs outputs, and/or conditions or states. For example, in 220 the active manager can instruct a component of a battery and/or a discharge-load (e.g., a BMS of a battery pack, or a processor of a battery pack and/or discharge-load) to monitor inputs, outputs, and/or conditions or states of components of the battery and/or discharge-load. In operation 220 (or, alternatively, in repeating operations 210-214) the active manager can receive results of such monitoring and can determine, in repeating operations 210-218, to modify an operation of the discharge-process. For example, based on results of such monitoring, in 218 the active manager can determine to modify an operation of the discharge process and, in 220, the modification can, for example, reduce (or, alternatively, increase) a current flow from the battery or into the discharge-load, or disconnect a discharge-circuit of the battery and/or discharge-load.

Returning to operation 214, as previously described the active manager can determine, in 214, to not continue the discharge process. In operation 214 the active manager can determine to not continue the discharge process based on a variety of additional transfer status determined in operation 210. For example, transfer status determined in 210 can indicate that a technician or system has instructed or signaled (e.g., via an interface coupled to the active manager) the active manager to terminate the discharge process. Accordingly, in operation 214 the active manager can determine to not continue the discharge process based on the status indicating the technician's signal to terminate the discharge-process.

Transfer status determined in operation 210 can indicate a disconnection of the smart cable (or, wires therein) from the battery and/or discharge-load and, in 214, the active manager can determine to not continue the discharge process based on the disconnection of the smart cable. In operation 214 the active manager can determine to not continue the discharge process based, for example, on a transfer status determined in 210 indicating that the discharge process cannot continue safely, without risk of damage, and/or that the discharge-load can no longer use, or use productively, energy transferred from the battery. An active manager can determine, in operation 214, to not continue a discharge process based on additional transfer status indicating that the discharge-load has completed an operation, and/or a function, utilizing energy transferred from the battery.

In other example, in operation 214 the active discharge manager can determine to not continue the discharge process based on additional transfer status determined in operation 210 indicating: that a temperature of the battery, the discharge-load, and/or the smart cable is above (or, alternatively, below) a threshold condition; that a current flow of the battery, the smart cable, and/or the discharge-load is not within a discharge range; that the battery has an SOC or voltage below a threshold level, and/or that the discharge-load has an SOC or voltage above a threshold level.

If, in operation 214, the active manager determines to not continue the discharge process, in operation 216 the active manager terminates the discharge process. Terminating the discharge process in operation 216 can include the active manager performing, or initiating, disconnection of the battery and/or the discharge-load, such as by opening, a switch connecting a power wire of the smart cable to a polarity terminal of one or both of the battery and the discharge-load. Terminating a discharge operation, in operation 216, can include the active manager communicating to the discharge-load to discontinue operations using energy transferred from the battery.

While the example of FIG. 2 depicts communication of status information in operation 212, this is not intended to limit embodiment. Rather, in embodiments any or all of the operations of method 200 can include communicating status information (e.g., status of a battery and/or discharge-load, and/or progress of a discharge process), such as to a technician and/or a computing system. Further, the foregoing description of method 200 is for purposes only of illustrating the methods of the disclosure, and is not intended to limit embodiments. It would be apparent to one of ordinary skill in the art, for example, that an active manager can receive, display, and/or communicate status and/or information not shown in FIG. 2, and that an active manager can utilize such status or information received to determine, in operation 202, a connection between a battery and a discharge-load, and/or to make the determinations of operations 206, 214, and/or 218.

Additionally, while method 200 can be performed with a high capacity battery, method 200 is not limited to such batteries. Similarly, method 200 is not limited to batteries installed in, or coupled to, a high load consumer (or, any particular power consumer other than a discharge-load). It would be apparent to one of ordinary skill that method 200, or a method similar to method 200, can be equally performed with batteries other than high capacity batteries, and can be performed with batteries not installed in, or coupled to, a power consumer (e.g., method 200 can be performed on a battery disconnected from a load).

Figure 3A:
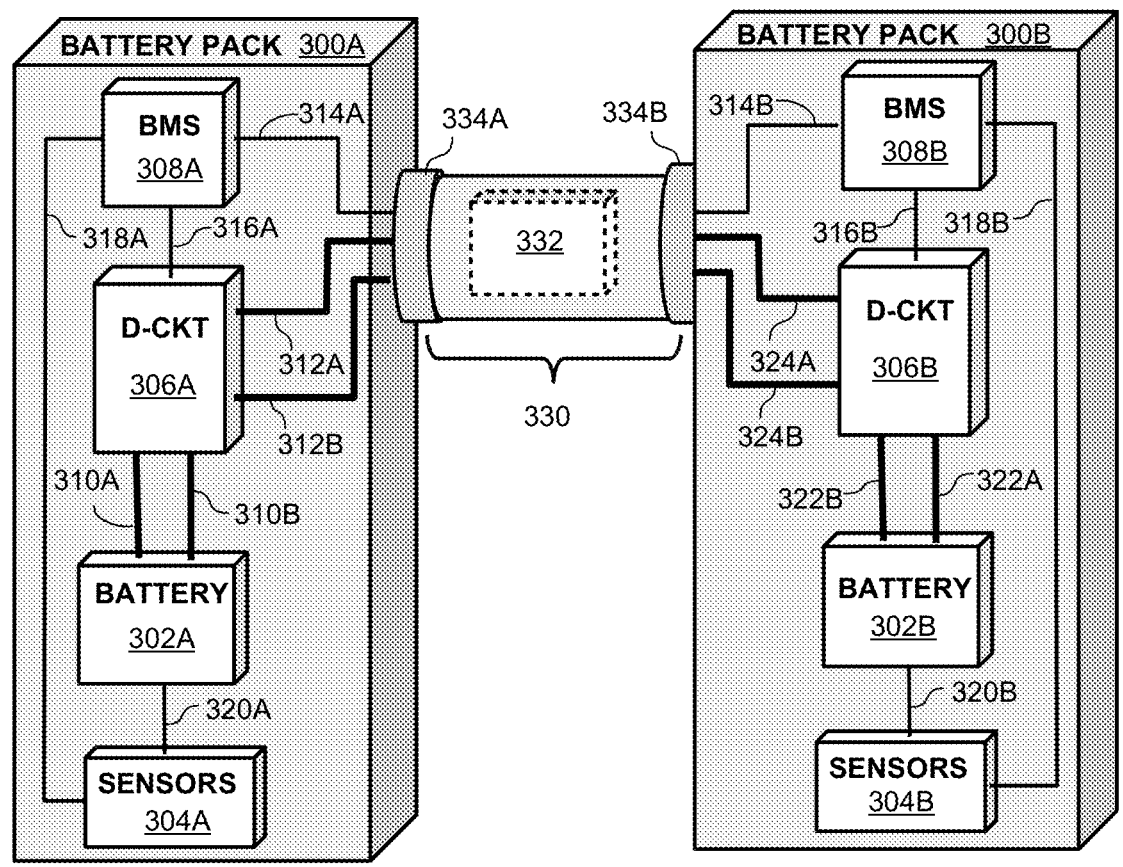
FIG. 3A illustrates an example smart cable connected to a battery and a discharge-load, according to aspects of the disclosure.
Figure 3B:
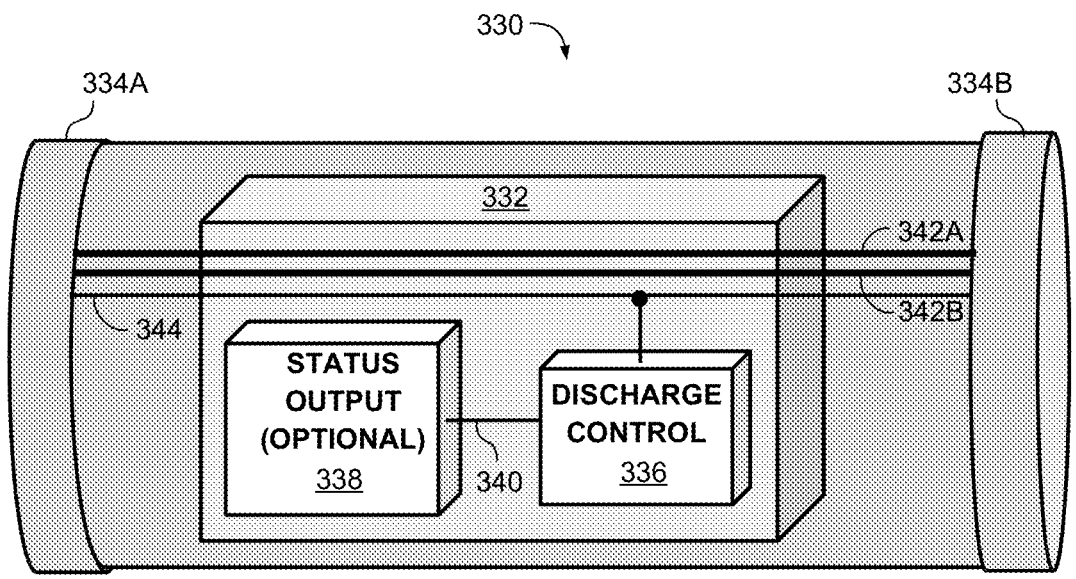
FIG. 3B illustrates an example active manager of a smart cable, according to aspects of the disclosure.

Embodiments can include particular system, battery, smart cable, and/or discharge-load structures to perform methods, and/or operations of methods, of the disclosure, such as method 200 of FIG. 2, or operations thereof. FIG. 3A illustrates an example embodiment—comprising a battery, a smart cable, and a discharge-load—for performing a discharge process such as illustrated by example method 200 of FIG. 2. FIG. 3B further illustrates the example smart cable and active manager of FIG. 3A.

Turning first to FIG. 3A, BATTERY PACK 300A is shown coupled to BATTERY PACK 300B (collectively, "battery packs 300"), by smart cable 330 (hereinafter, "cable 330"). In embodiments, BATTERY PACK 300A and 300B can function as (or, contain) high capacity batteries that can provide power to a high load consumer. BATTERY PACK 300A can be a battery subject to discharge, such as for reasons previously described (e.g., a service action), and BATTERY PACK 300B can serve as a discharge-load to receive energy transferred from BATTERY PACK 300A. For example, BATTERY PACK 300B can serve as a replacement battery for BATTERY PACK 300A in a system (e.g., a computing system) utilizing BATTERY PACK A to provide power to a high power consumer of the system. Cable 330 can function as a smart cable to actively manage a discharge process to transfer energy from BATTERY PACK 300A to BATTERY PACK 300B.

In FIG. 3A, BATTERY PACK 300A is shown comprising a battery management system, BMS 308A, discharge circuit D-CKT 306A, BATTERY 302A, and SENSORS 304A. BMS 308A is shown coupled to D-CKT 306A by interface 316A and to SENSORS 304A by interface 318A. FIG. 3A further depicts BATTERY 302A coupled to SENSORS 304A by interface 320A, and to D-CKT 306 by interfaces 310A and 310B. Interface 314A connects BMS 308A to cable 330 (e.g., via connector 334A of cable 330), and interface 312A and 312B connect D-CKT 306A to cable 330 (e.g., via connector 334A of cable 330).

In embodiments, and for purposes of illustrating the example, but not intended to limit embodiments, interfaces 310A, 310B, 312A, and 312B can be, or can include, power wires to connect to polarity terminals of BATTERY 302. However, it would be appreciated by one of ordinary skill in the art that interfaces 310A, 310B, 312A, and 312B can comprise wires (e.g., signal wires) and/or interfaces other than, or in addition to, power wires.

In embodiments, and as shown in FIG. 3A, BATTERY PACKS 300A and 300B can be identical, or similar. Thus, in BATTERY PACK 300B, BMS 308B can be identical or, similar, to BMS 308A, D-CKT 306B can be identical or, similar, to D-CKT 306A, BATTERY 302B can be identical or, similar, to BATTERY 302A, and SENSORS 304B can be identical or, similar, to SENSORS 304A. Interfaces 314B, 316B, 318B, and 320B can be identical, and/or function similarly, to interfaces 314A, 316A, 318A, and 320A, respectively. Interfaces 324A, 324B, 322A, and 322B can be identical, and/or function similarly, to interfaces 312A, 312B, 310A, and 310A, respectively. In embodiments, interfaces 314A and/or 314B can comprise, or connect to, a status interface of smart cable 330. Interfaces 324A, 324B, 322A, and 322B can be, or can include, power wires to connect BATTERY 302B to power wires of cable 330, similar to respective interfaces 312A, 312B, 310A, and 310A of BATTERY PACK 300A.

FIG. 3A further depicts cable 330 comprising active manager 332, integrated with cable 330 as a component of cable 330, and connectors 334A and 334B. In embodiments, active manager 332 can comprise one or more electronic circuits, one or more processors, or a combination of these. Active manager 332 can perform a method, such as example method 200 of FIG. 2, to actively manage a discharge process from BATTERY PACK 300A to BATTERY PACK 300B.

Connectors 334A and 334B are depicted in FIG. 3A connecting cable 330 to each of BATTERY PACKS 300A and 300B. While not shown in FIG. 3A, it would be understood by one of ordinary skill in the art that connectors 334A and 334B can connect to a mating connector of each of BATTERY PACKS 300A and 300B, and contacts (e.g., pins or sockets) of connectors 334A and 334B of a smart cable, such as 330, can connect to mating contacts of connectors not shown but included in BATTERY PACKS 300A and 300B. While also not shown in FIG. 3A, in embodiments connectors 334A and/or 334B can include a plug detection feature, such as described in reference to operation 202 of FIG. 2. In embodiments a plug detection feature can be included, in whole or in part, in a battery (e.g., BATTERY PACK 300A), a smart cable (e.g., 330), and/or a discharge-load (e.g. BATTERY PACK 300B). An active manager, such as 332, can use an output of such a plug detection feature to detect a connection to BATTERY PACK 300A and/or 300B.

Further, cable 330 can connect—directly or, alternatively, indirectly—interfaces 312A, 312B, and 314A to respective interfaces 324A, 324B, and 314B. While FIG. 3A illustrates cable 330 connecting to BATTERY PACK 300A using connector 334A, and to BATTERY PACK 300B using connector 4334B, this is not intended to limit embodiments, and it would be apparent to one of ordinary skill in the art that a connector of a smart cable, such as connectors 334A and 34B of cable 330, can connect interchangeably to a battery and a discharge-load.

In embodiments, a battery management system, such as BMS 308A and/or 308B, can comprise one or more circuits and/or processors. Discharge circuit D-CKT 306A can function to connect interfaces 310A and 310B to interfaces 31A and 312B, respectively. For example, D-CKT 306A can include a switch to connect, and/or disconnect, one or both of interfaces 310A and 310B to or from respective interfaces 312A and 312B. BMS 308A can use interface 314A to instruct D-CKT 306A to connect and/or disconnect interfaces 310A and 310B to or from respective interfaces 312A and 312B. D-CKT 306A can modify a voltage or current flow of BATTERY 302A and/or wires 310A and/or 310B.

SENSORS 304A can be sensors to sense condition status of battery 302A, such as temperature, voltage, current output (and/or input), and/or SOC of the battery. However, this is not to limit embodiments, and it would be apparent to one of ordinary skill in the art that sensors, such as 304A, can sense, or otherwise determine, various parameters of a battery in addition to, or in lieu of, those parameters just described. D-CKT 306B, BMS 308B, SENSORS 304B, and BATTERY 302B can interconnect and function similarly in BATTERY PACK 300B.

FIG. 3A further illustrates BMS 308A and 308B connecting, via respective interfaces 314A and 314B (hereinafter, collectively "interfaces 314), to cable 330 and, in embodiments, active manager 332 can utilize interfaces 314 to communicate with BMS 308A and 308B, respectively. For example, active manager 332 can utilize interface 314A to receive from BMS 308A a transfer status (and/or other) parameters of BATTERY 302A, received by BMS 308A from sensors 304A. Additionally or, alternatively, active manager 332 can utilize interface 314B to receive, from BMS 308B, states, a transfer status of BATTERY 302B, such as a condition status received by BMS 308B from sensors 304B.

To illustrate further, BATTERY PACK 300A can be a battery installed in a computing system and requiring service. BATTERY PACK 300B can be a replacement battery, to replace BATTERY PACK 300A in the computing system. Accordingly, a technician can transport BATTERY PACK 300B to the location of the computing system, and can transport BATTERY PACK 300B in a low SOC of BATTERY 302B (e.g., an SOC below a SOC threshold for safe transport). The technician can connect BATTERY PACK 300B, as a discharge-load, to BATTERY PACK 300A using cable 330. Active manager 332 can perform a discharge process, using operations such as in the example of method 200 of FIG. 2, to: detect a connection of cable 330 to BATTERY PACK 300A and/or 300B; determine a transfer status of cable 330, BATTERY PACK 300A, and/or BATTERY PACK 300B (and/or, components of these); and to actively manage (e.g., initiate, continue, modify, and/or terminate) a discharge process to transfer energy from BATTERY 302A to BATTERY 302B. As BATTERY PACK 300B is to be a replacement for BATTERY PACK 300A in the computing system, and has been transported to the location of BATTERY PACK 300A with BATTERY 302B in a low SOC, transferring charge held in BATTERY 302A to BATTERY 302B to raise the SOC of BATTERY 302B can be a productive use of energy transferred from BATTERY 302A.

As previously described, in embodiments an active manager, such as 332, can utilize an interface, such as 314A, to communicate with a component of a battery, such as BMS 308A and/or D-CKT 306A, in BATTERY PACK 300A, and can use such communications, for example, to determine a transfer status of BATTERY 302A, and/or power wires 310A, 310B, 312A, and/or 312B. In embodiments, discharge circuit 306A and/or SENSORS 304A can include circuitry to monitor a transfer status of BATTERY 302A, power wires 310A, 310B, 312A, and/or 312B (e.g., temperature, voltage, and/or current flow); to switch connections between power wires 310A and 312A, and/or between 310B and 312B; and can include circuits to establish and/or modify a rate of discharge of BATTERY 302A.

In a similar manner, active manager 332 can use interface 314B to perform similar functions with respect to BATTERY 302B, such as to determine a transfer status of power wires 322A, 322B, 324A, and/or 324B; to determine a transfer status of BATTERY 302B; to instruct discharge circuit D-CKT 306B to switch connections between power wires switch connections between power wires 322A and 324A, and/or between 322B and 324B; and/or to initiate, continue, and/or terminate discharge of BATTERY 302B. Active manager 332 can utilize interface 314B to instruct discharge circuit D-CKT 306A to establish a particular rate of discharge of BATTERY 302B, and/or to modify a rate of discharge of BATTERY 302B. In the process of discharging BATTERY 302A to BATTERY 302B, an active manager can make productive use of the energy transferred from BATTERY 302A, such as to charge BATTERY 302B, and/or to provide power for components of BATTERY PACK 302B (e.g., to provide power to BMS 308B, and/or D-CKT 306B) to perform useful and/or productive operations or functions, whether or not these are related, directly or indirectly, to the discharge process.

As described in reference to operation 220 of method 200, in FIG. 2, an active manager can modify an operation of a discharge process in response to a transfer status determined during the discharge process. As further described in reference to operation 220, modifying an operation of a discharge process can include an active manager instructing a component of a battery, smart cable, and/or discharge-load to monitor particular inputs and/or output, and the active manager receiving results of such monitoring to determine whether or not, and in what manner, to modify operations of the discharge process (e.g., reduce a current flow in response to such results).

In the example of FIG. 3A, BATTERY PACKs 300A and 300B each include a BMS (BMS 308A and 308B, respectively) and such a BMS can interact with the active manager to sense and/or control parameters of the discharge process. However, in some circumstances a BMS can encounter, or experience, a failure, such as a failure of a processor included in the BMS or a failure in a sensor or interface. In particular, in the case that a battery is to be discharged as part of a service operation, such as to replace a battery pack, an active manager may determine that a BMS, or other component of the battery pack used in the discharge process, has failed (or, may be experiencing intermittent failures). An active manager can determine such a failure condition, for example, in performing an operation such as 210 and 214, and/or 218, in method 200 of FIG. 2, to determine a transfer status and to determine to take an action in response.

As result of such a failure, an active manager may not be able to determine status, such as a transfer status, during a discharge process. In response, an active manager can, in performing an operation such as 220 of method 200, instruct an alternative component, such as a component of a smart cable and/or discharge-load, to perform operations to substitute for the failing component. Thus, in FIG. 3A, active manager 332 can determine, for example, that BMS 308A in BATTER PACK 300A has encountered or experienced a failure and, in response, can instruct BMS 308B of BATTERY PACK 300B, for example, to perform a substitute operation. For example, in response to determining a failure associated with BMS 308A, in performing an operation such as 220 of method 200, in FIG. 2, ACTIVE MANAGER 332 can instruct BMS 308B, in BATTERY PAKC 300B, to monitor input values (e.g., voltages and/or current flows of power wires 324A and/or 324B) to substitute for similar, or corresponding, output values received from BMS 308A (e.g., voltages and/or current flows of power wires 314A and/or 3214B)

The foregoing examples of FIG. 3A are intended only to illustrate example embodiments of a battery subject to discharge, a smart cable, an active manager integrated with the cable, and/or a discharge-load, configured to discharge energy from a battery to a discharge-load. The examples of FIG. 3A are not intended, however, to limit embodiments, and it would be apparent to one of ordinary skill in the art that a battery pack, a battery, a smart-cable, and/or a discharge-load can include components in addition to or, in lieu of, those illustrated in FIG. 3A; and/or can have structures other than as illustrated in FIG. 3A, within the scope of the disclosure. Further, it would be apparent to one of ordinary skill in the art that an active manager, a battery (such as BATTERY PACK 300A and/or 300B), and/or a discharge-load can utilize interfaces and components of a battery, smart cable, and/or a discharge-load to perform a variety of functions, not exhaustively disclosed herein, associated with discharging a battery and making productive use of the discharged energy.

FIG. 3B illustrates in more detail an example embodiment of smart cable 330 of FIG. 3A. In FIG. 3B, cable 330 includes active manager 332, interface 344, and power wires 342A and 342B. As described with reference to FIG. 3A, in embodiments active manager 332 can be integrated with cable 330 as a component of cable 330. As further shown in FIG. 3B, power wires 342A and 342B can connect directly between connectors 334A and/or 334B, so as to connect to respective power wires of a battery and/or as discharge-load, such as to 312A and 312B of BATTERY PACK 300A, and 324A and 324B of BATTERY PACK 300B, in the example of FIG. 3A FIG. 3B further depicts active manager 332 comprising DISCHARGE CONTROL 336 connected via interface 340 to optional STATUS OUTPUT 338. In embodiments, DISCHARGE CONTROL 336 can comprise one or more electronic circuits, one or more processors, or a combination of electronic circuits and processors. DISCHARGE CONTROL 336 can, using the circuits and/or processors, perform operations of the disclosure, such as operations of method 200, of FIG. 2, and as just described with reference to FIG. 3A. For example, in embodiments DISCHARGE CONTROL 336 can (e.g., using D-CKT 306A) connect (and/or disconnect) power wires of a battery and a smart cable, and/or can modify a voltage or current flow of BATTERY 402A and/or wires 410A and/or 410B. DISCHARGE CONTROL 336 modifying such voltages and/or current flows can, for example, affect (e.g., reduce or, alternatively, increase) conditions such as temperature of cable 330 and/or BATTERY PACKs 300A and/or 300B (and/or components thereof); rate of discharge of a battery, such as BATTERY 302A; and/or use of energy transferred from BATTERY 302A by BATTERY PACK 300B (e.g., to charge BATTERY 302B).

In embodiments, interface 344 can comprise a status interface of smart cable 330, and can connect through connectors 334A and/or 334B to respective interfaces of a battery and/or discharge-load, such as to interfaces 314A and 314B of BATTERY PACKs 300A and/or 300B, in FIG. 3A. DISCHARGE CONTROL 336 can, thereby, use interface 344 to communicate with components of BATTERY PACKs 300A and/or 300B, such as BMS 308A and/or BMS 308B, so as to perform operations of the disclosure. While not shown explicitly in FIG. 3B, in embodiments connectors 334A and/or 334B (or, another component of cable 330) can include a plug detection feature, such as described in reference to operation 204 of FIG. 2. Active manager 332 can use an output of such a plug detection feature to detect a connection of cable 330 to a battery and/or to a discharge-load.

Active manager 332 includes optional STATUS OUTPUT 338, which can output (and/or communicate) a variety of status information associated with a discharge process, such as previously described in reference to example method 200 of FIG. 2. STATUS OUTPUT 338, in embodiments, can comprise a visual display (e.g., a display screen, or one or more LEDs. STATUS OUTPUT 338 can include an interface (e.g. signal wires and/or a wireless transmission device), not shown in FIG. 3B, and can, for example, use the interface to transmit status information to, for example, a device used by a technician. Active manager 332 can utilize interface 340 to instruct STATUS OUTPUT 338 to output and/or communicate such status, and/or other information related to he discharge process.

The foregoing examples of the description of FIG. 3B are intended only to illustrate the disclosure, such as to illustrate example embodiments of a smart cable and active manager.

These example are not intended, however, to limit embodiments, and it would be apparent to one of ordinary skill in the art that a smart cable and/or an active manager can include components in addition to or, in lieu of, those illustrated in FIG. 3B; and, that a smart cable and/or an active manager can have a structure other than as illustrated in FIG. 3B, within the scope of the disclosure. For example, STATUS OUTPUT 338 can be a component of DISCHARGE CONTROL 336, and active manager 332 (and/or, DISCHARGE CONTROL 336) can include (not shown in FIG. 3B) an element, such as a circuit or processor, to monitor condition or transfer status of BATTERY PACKs 300A and/or 300B, and/or smart cable 330, and can use interface 344 to obtain such information.

Figure 4A:
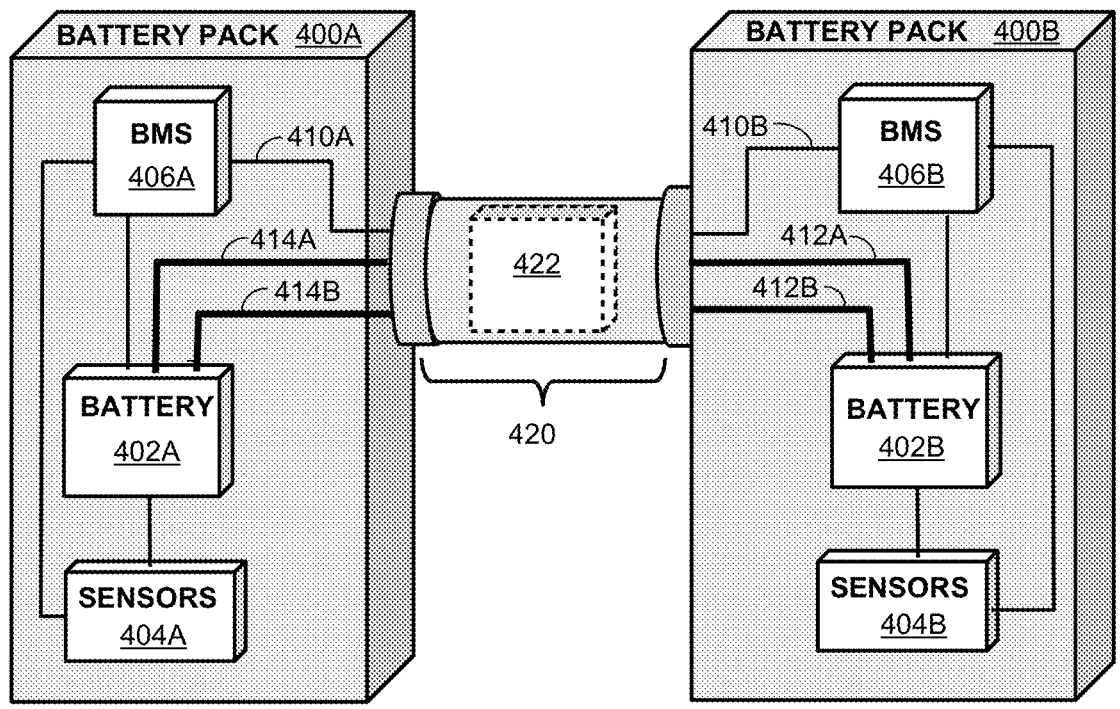
FIG. 4A illustrates an alternative example smart cable connected to a battery and a discharge-load, according to aspects of the disclosure.
Figure 4B:
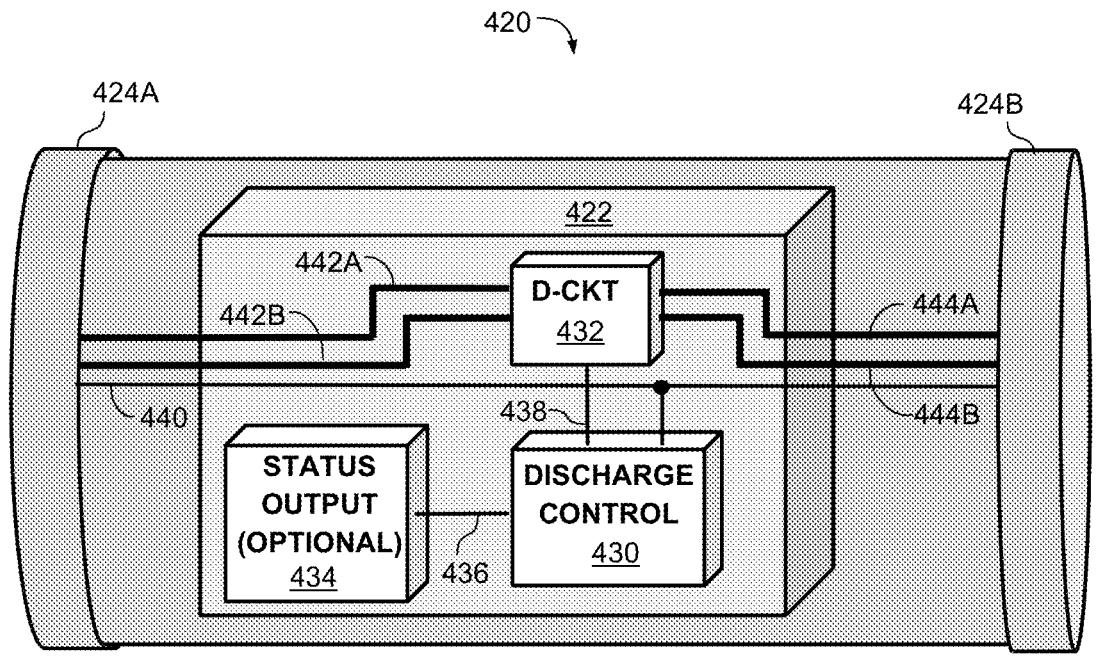
FIG. 4B illustrates an alternative example active manager of a smart cable, according to aspects of the disclosure.

As described with reference to D-CKT 306A and 306B of FIG. 3, in embodiments a discharge circuit can function to connect and/or disconnect power wires of a battery and/or discharge-load to or from a smart cable; to sense particular parameters of a battery, power wires, and/or a discharge-load; and/or to regulate a rate of discharge of energy from a battery and/or into a discharge-load. FIG. 3A illustrates BATTERY PACKS 300A and 300B including such discharge circuits by the examples of D-CKT 306A and 306B. However, FIGS. 3A and 3B are not intended to limit to embodiments an, in alternative embodiments, a discharge circuit can be wholly or partially omitted from a battery and/or a discharge-load, and can be included, wholly or partially, in an active manager of a smart cable. FIGS. 4A and 4B illustrate such an alternative example of a smart cable including a discharge circuit in an active manager.

FIG. 4A depicts cable 420 connecting BATTERY PACK 400A and BATTERY PACK 400B via respective connectors 424A and 424B. Similar to the example of BATTERY PACK 300A and 300B in FIG. 3, BATTERY PACK 400A can be, for example, a battery subject to discharge and BATTERY PACK 400B can be a discharge-load (e.g., a replacement battery pack for BATTERY PACK 400A) to receive energy transferred from BATTERY 402A.

Also similar to cable 330 of FIG. 3, in embodiments, cable 420 can be a smart cable and FIG. 4A shows cable 420 including active manager 422 integrated with cable 420 as a component of cable 420. In embodiments, active manager 422 can perform operations of an active discharge process, such as example method 200 of FIG. 2 and previously described with reference to active manager 332 of FIGS. and 3B. Active manager 422 can comprise one or more electronic circuits, one or more processors, or a combination of electronic circuits and processors, to perform such operations.

While FIG. 4A illustrates cable 420 connecting to BATTERY PACK 400A using connector 424A, and to BATTERY PACK 400B using connector 424B, this is not intended to limit embodiments, and it would be apparent to one of ordinary skill in the art that, in embodiments, connectors 424A and 424B of cable 420 can connect interchangeably to a battery and a discharge-load. While not shown in FIG. 4A, as previously described in reference to method 200 of FIG. 2, and cable 330 of FIG. 3A, in embodiments connectors 424A and 424B (or, another component) of cable 420 can include a plug detection feature, such as described in reference to operation 204 of FIG. 2. Active manager 422 can utilize an output of the plug detection feature to detect a connection of cable 420 one or both of BATTER PACK 400A and 400B.

In FIG. 4A, BATTERY PACKs 400A and 400B can be seen to be similar to BATTERY PACKs 300A and 300B, respectively, of FIG. 3A, having, respectively, battery management systems BMS 406A and 406B, BATTERYs 402A and 402B, and SENSORS 404A and 404B, interconnected similarly to those of BATTERY PACKs 300A and 300B of FIG. 3A. For example, as shown in FIG. 4A, BATTERY PACKs 400A and 400B include respective interfaces 410A and 410B connecting, respectively, BMS 406A and 406B to smart cable 420. In embodiments, interfaces 410A and/or 410B can comprise, or connect to, a status interface of smart cable 420.

However, as shown in FIG. 4A, unlike respective BATTERY PACKs 300A and 300B, of FIG. 3A, BATTERY PACKs 400A and 400B do not include a discharge circuit. Rather, in FIG. 4A BATTERYs 402A and 402B are shown connecting directly to cable 420 by means, respectively, of power wires 414A and 414B and power wires 412A and 412B. Cable 420 can, then, interconnect power wire 414A to power wire 412A, and 414B to 412B, to facilitate transfer of energy from BATTERY 402A to 402B.

Turning to FIG. 4B, an example embodiment of active manager 420 is shown to include DISCHARGE CONTROL 430, optional STATUS OUTPUT 434, and discharge circuit D-CKT 432. In embodiments, DISCHARGE CONTROL 430 and/or STATUS OUTPUT 434 can function as described with reference to DISCHARGE CONTROL 336 and STATUS OUTPUT 338 of FIG. 3B. In embodiments, DISCHARGE CONTROL 430 can comprise one or more electronic circuits, one or more processors, or a combination of electronic circuits and processors, and DISCHARGE CONTROL 430 can perform operations of the disclosure, such as described with reference to DISCHARGE CONTROL 336 of FIG. 3B. For example, in FIG. 4A cable 420 includes interface 440, which can connect to interfaces 410A and/or 410B of respective BATTERY PACKs 400A and 400B. In embodiments, interface 440 can comprise a status interface of smart cable 420 and, using interface 440, DISCHARGE CONTROL 430 can, for example, communicate with BMS 406A and/or 406B, such as to determine a transfer status of BATTERY 402A and/or 402B.

However, in FIG. 4B, power wires 442A, 442B, 444A, and 444B of cable 420 connect to D-CKT 432. In embodiments power wires 442A and/or 442B can connect (e.g., via connector 424A of cable 420), respectively, to power wires 410A and 410B of BATTERY PACK 400A, in FIG. 4A. Similarly power wires 444A and/or 444B can connect (e.g., via connector 424B of cable 420), respectively, to power wires 412A and 412B of BATTERY PACK 400B, in FIG. 4A. Accordingly, active manager 422 can use D-CKT 432 to connect and/or disconnect power wires 442A and 44A, and/or 442B and 444B, to connect BATTERY 402A to BATTERY 402B to transfer energy from BATTERY 402A to BATTERY 402B. Using interface 438, DISCHARGE CONTROL 430 can, for example, detect a connection of cable 420 (e.g., connectors 424A and./or 424B) to BATTERY PACK 400A and/or 400B. Using interface 438, DISCHARGE CONTROL 430 can instruct discharge circuit D-CKT 432 to switch connections between power wires 442A and 444A, and/or between 442B and 444B, and/or to initiate, continue, and/or terminate discharge of BATTERY 402A to BATTERY 402B, Additionally, in embodiments D-CKT 432 can include circuits and/or processors to control and/or modify conditions or states of wires 442A, 442B, 44A, and 44B, and/or D-CKT 432 itself, such as voltages and/or current flows. D-CKT 432 (and/or other components of active manger 422) modifying such voltages and/or current flows can, for example, affect (e.g., reduce or, alternatively, increase) conditions such as a temperature of cable 420 and/or BATTERY PACKs 400A and/or 400B (and/or components thereof); rate of discharge of BATTERY 402A; and/or use of energy transferred from BATTERY 402A by BATTERY PACK 400B (e.g., to charge BATTERY 402B).

Figure 5A:
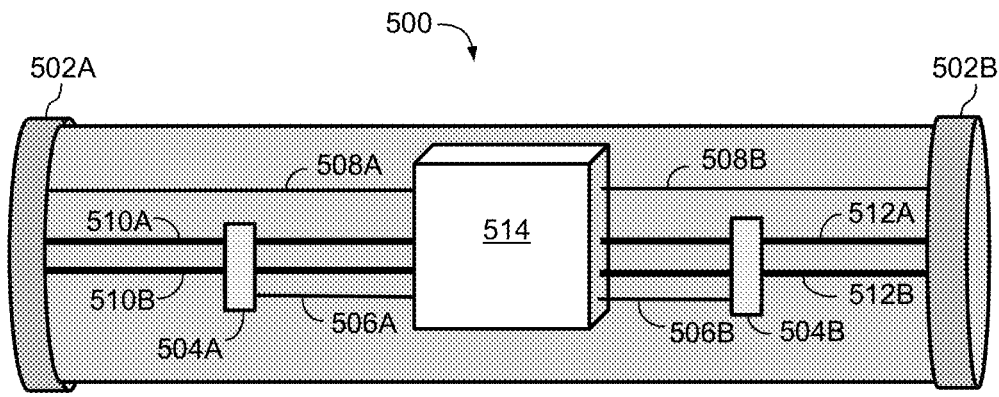
FIG. 5A illustrates an alternative example smart cable including sensors, according to aspects of the disclosure.

FIG. 5A depicts an example embodiment of a smart cable that includes an example means by which an active manager of a smart cable can determine a transfer status of the smart cable (and/or, as previously described, a separate discharge cable). FIG. 5A illustrates example smart cable 500 having active manager 514 integrated with cable 500 as a component of the cable. Similar to the examples of active managers 322 and 422 in FIGS. 3A/3B and 4A/4B, respectively, in embodiments active manager 514 can comprise one or more electronic circuits, one or more processors, or a combination of electronic circuits and processors, and can perform a method similar to method 200 of FIG. 2 to actively manage transfer of energy between a battery and a discharge-load coupled by smart cable 500.

FIG. 5A further depicts smart cable 500 including interfaces 508A and 508B, and power wires 510A, 510B, 512A, and 512B. Smart cable 500 includes connectors 502A and 502B, which can (interchangeably) connect smart cable 500 to a battery and a discharge-load. While not shown in FIG. 5A, in embodiments connectors 502A and/or 502B (or, another component of cable 500) can include a plug detection feature, such as described in reference to operation 204 of FIG. 2. Active manager 514, in such an embodiment, can utilize an output of such a plug detection feature to detect a connection of cable 500 to a battery and/or to a discharge-load.

In embodiments, active manager 514 can function similarly to example active manager 322 of FIGS. 3A and 3B, or example active manager 422 of FIGS. 4A, and 4B, to actively manage discharge of a battery to a discharge-load and, optionally, to make productive use the energy transferred from the battery. For example, in embodiments interfaces 508A and 508B can comprise a status interface of smart cable 500. Interface 508A can connect to a status interface of a battery (e.g., 314A of FIG. 3A or 410A of FIG. 4A), and interface 508B can connect to a status interface of a discharge-load (e.g., 314B of FIG. 3A or 410B of FIG. 4A). Using interface 508A, for example, active manager 514 can determine a transfer status of the battery and, via interface 508B, for example, active manager 514 can determine a transfer status of the discharge-load.

In embodiments, active manager 514 can use interfaces 508A and/or 508B, for example, to detect a connection of cable 500 (e.g., connectors 522A and./or 522B) to a battery and/or a discharge-load. Power wires 510A, 510B, 512A, and 51B can interconnect internal to active manager 514 and active manager 514 can switch connections between power wires 510A and 512A, for example, and/or between 510B and 512B, to initiate, continue, and/or terminate discharge of a battery connected to power wires 510A and 510B (or, alternatively, to power wires 512A and 512B) into a discharge-load connected to power wires 512A and 512B (or, alternatively, to power wires 510A and 510B). In alternative embodiments, interfaces 510A and 512A can comprise a single power wire passing through cable 500 and interfaces 510B and 512B can similarly (but, not necessarily) comprise a single power wire passing through cable 500, similar to cable 330 as shown in FIG. 3B.

FIG. 5A further depicts smart cable 500 including thermal sensors 504A and 504B connected to active manager 514 via respective interfaces 506A and 506B. In embodiments, thermal sensor 504A can sense a temperature of one or both of power wires 510A and/or 510B and thermal sensor 504B can sense a temperature of one or both of power wires 512A and/or 512B. Using interfaces 506A and 506B, for example, active manager 514 can receive, or determine, the temperatures of power wires 510A, 510B, 512A, and/or 512B and can use the temperature information to manage the transfer of energy from a battery to a discharge-load in response to varying temperatures of the power wires. For example, active manager 514 can receive and use the power wire temperature information in a manner similar to operations 206, 214, 218, and 200 of method 200 of FIG. 2, to determine a transfer status comprising temperature(s) and, optionally, modify an operation of a discharge process based on the transfer state.

While FIG. 5A depicts smart cable 500 having two temperature sensors (504A and 504B), this is not intended to limit embodiments. It would be apparent to one of ordinary skill in the art that a smart cable, such as 500, can include a single such sensor, or can include a plurality of such sensors more than two. It would be similarly apparent to one of ordinary skill in the art that sensors, such as 504A and 504B, can be included in a discharge cable separate from a smart cable, in embodiments that utilize a discharge cable separate from a smart cable. It would be further apparent to one of ordinary skill in the art that such sensors are not limited to sensing only temperature, and that such sensors can sense other conditions or states of the signal and/or power wires, and/or other components, of a smart cable, in addition to, or in lieu of, temperature, such as a voltage and/or a current flow.

As previously described, a smart cable comprises a cable having an active manager integrated with the cable. As used herein, "integrated" with a smart cable means that the active manager or, alternatively, "active" elements of an active manager, are components of a smart cable, whether as components internal to, or otherwise included in, the cable, or as components coupled (mechanically, electrically, and/or mechanically) with the smart cable. "Active elements" of an active manager refers particularly to components of an active discharge manager that can perform operations of an actively manager discharge process, such as described in refence to FIGS. 2, 3A/3B, and 4A/4B: detecting a connection of the smart cable to a battery and/or discharge-load; determining a transfer status of a battery, smart cable, and/or discharge-load; and/or initiating, modifying, and/or terminating a discharge process based on a transfer status associated with the smart cable.

Figure 5B:
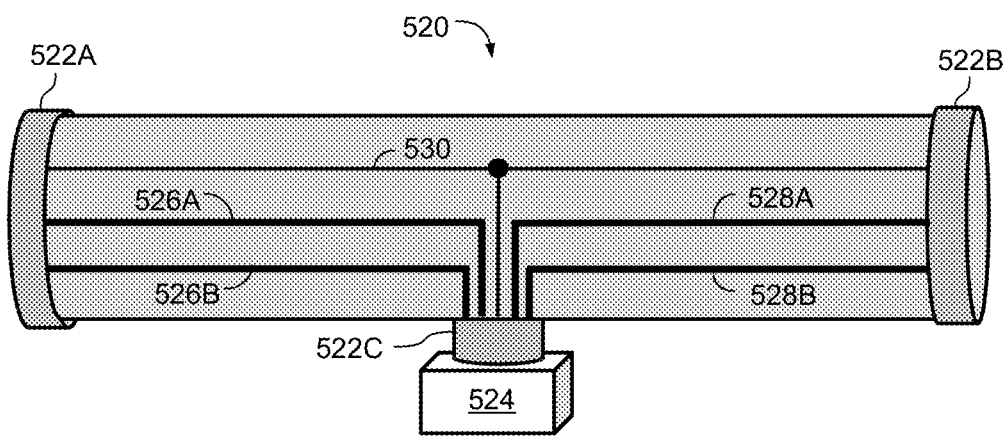
FIG. 5B illustrates an alternative example configuration of an active manager of a smart cable, according to aspects of the disclosure

The example smart cables 330, 420, and 500 of respective FIGS. 3B, 4B, and 5A illustrate an active manager integrated with a smart cable by incorporation of the active manager as a component included in the cable. However, this is not intended to limit embodiments. In alternative embodiments, an active manager of a smart cable can be integrated with a smart cable as a component external to, or separate from, the smart cable per se, while being mechanically, electrically, and/or communicatively coupled to the smart cable. FIG. 5B illustrates an alternative example of an embodiment that integrates an active manager with a smart cable by coupling the active manager with the smart cable, without necessarily fully incorporating the active manager as a component of the smart cable.

FIG. 5B depicts example smart cable 520 comprising connectors 522A, 522B, and 522C, and active manager 524 integrated with cable 520 as coupled (mechanically, electrically, and/or communicatively) to cable 330 through connector 522C. Although not shown as such in FIG. 5B, active manager 524 can be included in, for example, one or both (as a distributed active manager) of connectors 522A and 522B, or can be an element completely separate from cable 520 other than to connect to wires and/or interfaces of cable 520 (e.g., via a cable connecting to connector 522C of smart cable 500). As previously described, active manager 524 can be included, in part or in whole, in a battery and/or a discharge-load.

In embodiments, active manager 524 can be similar to the example active managers of FIGS. 3B, 4B, and 5A, and can perform a method, or operations thereof, similar to method 200 of FIG. 2 to actively manage transfer of energy between a battery and a discharge-load coupled by smart cable 520. Connectors 522A and 522B can couple smart cable 520 to a battery and a discharge load (e.g., can couple power wires 526A, 526B, 528A, and/or 528B to power wires of a battery and a discharge-load). In embodiments, interface 530 can comprise a status interface of smart cable 520 and connectors 522A and 522B can couple interface 530 to respective interfaces of a battery and/or a discharge-load (e.g., to couple interface 530 to interfaces 314A and/or 314B of FIG. 3A, or interfaces 410A and 410B of FIG. 4A). While not shown in FIG. 5B, in embodiments connectors 522A and/or 522B can include a plug detection feature, such as described in reference to operation 204 of FIG. 2. Active manager 524 can utilize an output of such a plug detection feature to detect a connection of cable 520 to a battery and/or to a discharge-load.

Although FIG. 5B depicts active manager 524 connected to interface 530 through connector 522C, this is not intended to limit embodiments. For example, in an alternative embodiment, active manager 524 can communicate to elements of a battery and/or discharge-load through an interface not included in smart cable 520 (e.g., a direct connection to an interface in a battery and/or discharge-load, or wirelessly).

Figure 6:
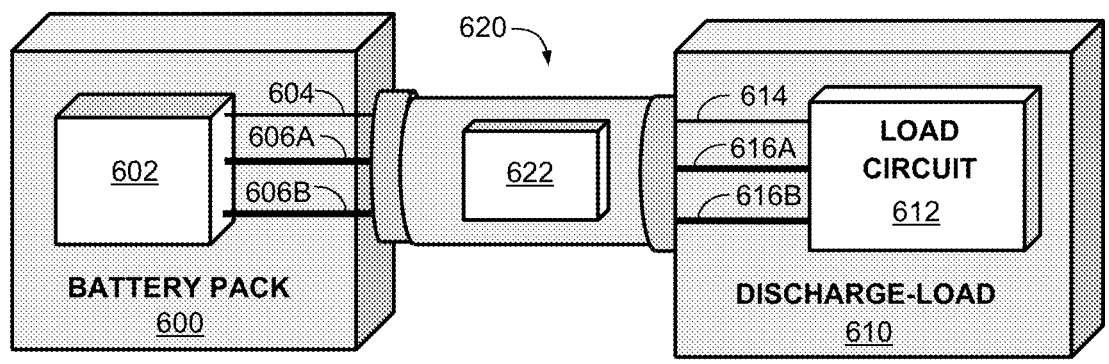
FIG. 6 illustrates an alternative discharge-load, according to aspects of the disclosure.

As previously described, in an embodiment a discharge-load can comprise elements other than a resistive load, and/or a battery or elements that include a battery, and such a discharge-load can productively utilize energy transferred from a battery to perform an operation or function other than simply dissipating the energy from the battery (e.g., dissipating the energy as waste heat). FIG. 6 illustrates an embodiment that includes such a discharge-load. In FIG. 6, BATTERY PACK 600 is shown connected by smart cable 620 to DISCHARGE-LOAD 610. In embodiments, battery pack 600 can be, for example, a battery pack similar to the examples of BATTERY PACK 300A in FIG. 3A or BATTERY PACK 400A in FIG. 4A, and FIG. 6 further depicts BATTERY PACK 600 including battery 602. BATTERY PACK 600 can be subject to a discharge process using smart cable 620 and DISCHARGE-LOAD 610 to discharge battery 602.

In FIG. 6, smart cable 620 is shown including active manager 622 and, sing the connection of smart cable 620 between BATTERY PACK 600 and DISCHARGE-LOAD 610, active manager 622 can discharge battery 602 into DISCHARGE-LOAD 610. For example, in an embodiment active manager 622 can perform operations of method 200, of FIG. 2, to discharge battery 602 into DISCHARGE-LOAD 610.

FIG. 6 further illustrates DISCHARGE-LOAD 610 including LOAD CIRCUIT 612. In embodiments, a discharge process can transfer energy from battery 602, through smart cable 620, to LOAD CIRCUIT 612. LOAD CIRCUIT 612 can comprise circuits, processors, or a combination of these, and LOAD CIRCUIT 612 can use energy transferred from BATTERY PACK 600 to perform one or more operations or functions that can have a useful result other than to simply dissipate the energy as waste heat in a resistive load.

Smart cable 620 can be a smart cable similar, for example, to cable 330 in FIG. 3B, 420 in FIG. 4B, 500 in FIG. 5A, or 520 in FIG. 5B. Active manager 622 can be similar to example active managers 332 in FIG. 3B, 422 in FIG. 4B, 514 in FIG. 5A, and/or 524 in FIG. 5B. While not shown in FIG. 6, smart cable 620 can include sensors, such as 504A and 504B of FIG. 5A, to determine a transfer status of elements of smart cable 620. In embodiments cable 620 (e.g., connectors of smart cable 620) can include a plug detection feature, such as previously described, and active manager 622 can utilize an output of such a plug detection feature to detect a connection of cable 620 to battery pack 600 and/or to DISCHARGE-LOAD 610.

In FIG. 6, battery 602 connects to smart cable 620 by means of interface 604 and wires 606A and 606B. In embodiments wires 606A and 606B can be power wires that connect polarity terminals of battery 602 to smart cable 620, similar to power wires of BATTERY PACK 300A and 300B of FIG. 3A, or 400A and 400B of FIG. 4A. While not shown in FIG. 6, n embodiments power wires 606A and 606B can connect to power wires (also not shown in in FIG. 6) of smart cable 620, and can connect to battery 602 using, for example, a discharge circuit that can be included in BATTERY PACK 600 or smart cable 622, or distributed between them. Interface 604 can be similar to interface 314A of FIG. 3A, or 410A of FIG. 4A, and can connect to a status interface of cable 620 (not shown in FIG. 6) to enable active manager 622 to detect a connection to battery 602, determine a transfer status of battery 602, and/or control discharge of battery 602 through smart cable 620 to DISCHARGE-LOAD 610.

In FIG. 6, LOAD CIRCUIT 612 is connected to smart cable 620 by means of interface 614 and wires 616A and 616B. In embodiments, wires 616A and 616B can connect to power wires (not shown in in FIG. 6) of smart cable 620, and can transfer energy, via such power wires in smart cable 620, from BATTERY PACK 600 to LOAD CIRCUIT 612. Interface 614 can be similar to interface 314B of FIG. 3A, or 410B of FIG. 4A, and can connect to a status interface of cable 620 (not shown in FIG. 6) to enable active manager 622 to detect a connection to LOAD CIRCUIT 612, determine a transfer status of LOAD CIRCUIT 612, and/or control discharge of battery 602 through smart cable 620 into LOAD CIRCUIT 612.

As previously described, in embodiments LOAD CIRCUIT 620 can be a circuit that can make productive use of energy transferred from a battery. For example, LOAD CIRCUIT 620 can be a circuit that can monitor, display, and/or communicate a transfer status of battery 602, a transfer status of smart cable 620, a transfer status of elements of DISCHARGE-LOAD 610 (e.g., power wires 616A and/or 616B), and/or a transfer status of active manager 622. LOAD CIRCUIT 620 can perform other operations or functions, whether or not such operations or functions are related, directly or indirectly, to discharging a battery, such as 602.

For example, LOAD CIRCUIT 620 can be included in a battery pack, such as 300B in FIG. 3A, or 400B in FIG. 4A, and LOAD CIRCUIT 620 can perform useful operations or functions (e.g., diagnostics or initialization operations or functions) related to preparing the battery pack to replace BATTERY PACK 600 in a system utilizing BATTERY PACK 600. However, such example are not intended to limit embodiments and it would be apparent to one of ordinary skill in the art that a load circuit, such as 620 in FIG. 6, of a discharge-load can perform a variety of operations and/or functions that utilize energy transferred from a battery, in a discharge process, to produce some useful result more than simply dissipating the energy (e.g., as waste heat).

Further, in embodiments active manager 622 can determine a transfer status (e.g., in performing an operation such as 204 and/or 210 in method 200 of FIG. 2) associated with LOAD CIRCUIT 612, such as a condition status of the circuit, and/or a status associated with LOAD CIRCUIAT 612 making productive use of energy discharged from battery 602. For example, active manager 622 can determine a transfer status associated with LOAD CIRCUIT 612 having completed an operation and/or function (e.g., a diagnostic or initiation operations) that makes use of energy discharged from battery 602.

The examples of the disclosure and, in particular, various examples of a smart cable, an active manager, illustrate structures and methods to perform a discharge process that can be actively managed to perform the process safely, without risk of damage to components, and that can make productive use of energy transferred from a battery during a discharge process. However, these are not intended to be limiting and it would be apparent to one of ordinary skill in the art that a smart cable, an active manager, a load circuit of a discharge-load, and/or components of these, can be implemented in varying combinations of a battery, a smart cable, a discharge-load, and/or components of these. Similarly, it would be apparent to one of ordinary skill in the art to make productive use of energy transferred from a battery, during a discharge process, using a variety of load-circuits in a discharge-load, performing a variety of useful operations and/or functions, other than as illustrated in the examples of the disclosure.

Thus, the descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, the method comprising:
  detecting, by an active discharge manager integrated with a smart cable, a first connection comprising a connection of the smart cable to at least one of a first battery and a first discharge load;
  detecting, by an active discharge manager a second connection comprising a connection coupling the first battery and the first discharge-load to transfer energy from the first battery to the first discharge-load;
  determining, by the active discharge manager using a status interface of the smart cable, in response to the detecting the first connection and the detecting the second connection, a first battery status and a first load status, the first battery status comprising a first transfer status associated with the first battery and the first load status comprising a first transfer status associated with the first discharge-load; and,
  initiating, by the active discharge manager, in response to the detecting the first connection and the detecting the second connection, based on the first battery status and the first load status, a discharge process to discharge the first battery and to transfer energy discharged from the first battery to the first discharge-load.

2. The method of claim 1, wherein the smart cable comprises at least one sensor;
  wherein the method further comprises the active discharge manager determining, based on an output of the at least one sensor, a transfer status of the smart cable; and,
  wherein the method of the active discharge manager initiating the discharge process comprises the active discharge manager initiating the discharge process based, further, on the transfer status of the smart cable.

3. The method of claim 1, wherein the method further comprises the active discharge manager:
  determining, based on the initiating the discharge process, using the status interface of the smart cable, a second battery status and a second load status, the second battery status comprising a second transfer status associated with the first battery and the second load status comprising a second transfer status associated with the first discharge-load; and,
  based on at least one of the second battery status and the second load status, performing one of terminating the discharge process and modifying an operation of the discharge process.

4. The method of claim 3, wherein the smart cable comprises at least one sensor;
  wherein the method further comprises the active discharge manager determining, based on an output of the at least one sensor, a transfer status of the smart cable; and,
  wherein the method of the active discharge manager performing the one of the terminating the discharge process and the modifying an operation of the discharge process comprises the active discharge manager performing the one of the terminating the discharge process and the modifying an operation of the discharge process based further on the transfer status of the smart cable.

5. The method of claim 1, wherein the method of the active discharge manager detecting the first connection comprises the active discharge manager detecting at least one of a connection of a first status interface of the smart cable to a corresponding status interface of the first battery and a connection of a second status interface of the smart cable to a corresponding status interface of the first discharge-load; and,
  wherein the method of the active discharge manager detecting the second connection comprises the active discharge manager detecting at least one of a connection of a first power wire to a corresponding first contact of the first battery and, a connection of the first power wire to a corresponding second contact of the first discharge-load.

6. The method of claim 1, wherein the smart cable comprises a plug detection feature; and,
  wherein the method of the active discharge manager detecting the first connection comprises the active discharge manager detecting the first connection based, at least in part, on an output of the plug detection feature.

7. The method of claim 1, wherein the first discharge-load comprises a load-circuit configured to make productive use of the energy transferred by the discharge process from the first battery to the first discharge-load; and,
  wherein the method further comprises the active discharge manager:

determining, using a status interface of the smart cable, a transfer status associated with the load-circuit making the productive use of the energy; and, based on the transfer status associated with the load-circuit making the productive use of the energy, performing one of terminating the discharge process and modifying an operation of the discharge process.

8. The method of claim 1, wherein the smart cable is re-usable to couple a second battery and a second discharge-load to transfer energy from the second battery to the second discharge-load.

9. A system, the system comprising:
a first battery;
a first discharge-load;
at least one power wire to electrically couple the first battery and the first discharge-load; and,
a smart cable comprising an active discharge manager integrated with the smart cable and a status interface, wherein the status interface is configured to communicatively couple to the active discharge manager, the first battery, and the first discharge-load, and
wherein the active discharge manager is configured to:
detect a first connection comprising a connection of the smart cable to at least one of a battery and a discharge load;
detect a second connection comprising a connection coupling the battery and the discharge-load to transfer energy from the battery to the discharge-load;
determine, using the status interface, in response to the detecting the first connection and the detecting the second connection, a first battery status and a first load status, the first battery status comprising a first transfer status associated with the first battery and the first load status comprising a first transfer status associated with the first discharge-load; and,
initiate, in response to in response to the detecting the first connection and the detecting the second connection, based on the first battery status and the first load status, a discharge process to discharge the first battery and to transfer energy discharged from the first battery to the first discharge-load.

10. The system of claim 9, wherein the smart cable further comprises at least one sensor;
wherein the active discharge manager is further configured to determine, based on an output of the at least one sensor, a transfer status of the smart cable; and,
wherein the active discharge manager configured to initiate the discharge process comprises the active discharge manager further configured to initiate the discharge process based further on the transfer status of the smart cable.

11. The system of claim 9, wherein the active discharge manager is further configured to:
determine, using the status interface and based on the initiating the discharge process, a second battery status and a second load status, the second battery status comprising a second transfer status associated with the first battery and the second load status comprising a second transfer status associated with the first discharge-load; and,
based on at least one of the second battery status and the second load status, perform one of terminating the discharge process and modifying an operation of the discharge process.

12. The system of claim 11, wherein the smart cable further comprises at least one sensor;

wherein the active discharge manager is further configured to determine a transfer status of the smart cable based on an output of the at least one sensor; and,
wherein the active discharge manager configured to perform the one of the terminating the discharge process and the modifying an operation of the discharge process comprises the active discharge manager further configured to perform the one of the terminating the discharge process and the modifying an operation of the discharge process based, further, on the transfer status of the smart cable.

13. The system of claim 9, wherein the smart cable comprises a plug detection feature; and,
wherein the active discharge manager configured to detect the first connection comprises the active discharge manager further configured to detect the first connection based on an output of the plug detection feature.

14. The system of claim 9, wherein the smart cable is re-usable to discharge a second battery into a second discharge-load.

15. The system of claim 9, wherein a power wire, among the at least one power wire to electrically couple the first battery and the first discharge-load, is included in a discharge-cable separate from the smart cable.

16. The system of claim 9, wherein the smart cable is removable from the first battery and the first discharge-load.

17. The system of claim 9, wherein the first discharge-load comprises a load-circuit configured to make productive use of the energy transferred by the discharge process from the first battery to the first discharge-load; and,
wherein the active discharge manager is further configured to:
determine, using the status interface of the smart cable, a transfer status associated with the making the productive use of the energy by the load-circuit; and,
perform, based on the transfer status associated with the making the productive use of the energy by the load-circuit, one of terminating the discharge process and modifying an operation of the discharge process.

18. A smart cable, the smart cable comprising:
a status interface; and,
an active discharge manager integrated with the smart cable, wherein the active discharge manager is configured to:
detect a first connection comprising a connection of the smart cable to at least one of a battery and a discharge load;
detect a second connection comprising a connection coupling the battery and the discharge-load to transfer energy from the battery to the discharge-load;
determine, using the status interface, in response to the detecting the first and the second connections, a first battery status and a first load status, the first battery status comprising a first transfer status associated with the battery and the first load status comprising a first transfer status associated with the discharge-load; and,
initiate, in response to the detecting the first and the second connections, based on the first battery status and the first load status, a discharge process to discharge the battery and to transfer energy discharged from the battery to the discharge-load.

19. The smart cable of claim 18, wherein the active discharge manager is further configured to:
determine, based on the initiating the discharge process, using the status interface, a second battery status and a second load status, the second battery status comprising a second transfer status associated with the battery and the second load status comprising a second transfer status associated with the discharge-load; and, based on at least one of the second battery status and the second load status, perform one of terminating the discharge process and modifying an operation of the discharge process.

20. The smart cable of claim 19, wherein at least one of the first battery status and the second battery status indicates a failure of a component of the battery; and, wherein the active discharge manager is further configured to instruct, based on the at least one of the first battery status and the second battery status indicating the failure of the component of the battery, the discharge-load to monitor an input of the discharge-load.

* * * * *